US012811719B2

(12) United States Patent
Liu et al.

(10) Patent No.: US 12,811,719 B2
(45) Date of Patent: Nov. 24, 2026

(54) ARITHMETIC CODING INCLUDING SYMBOL SEQUENCE DETERMINATION

(71) Applicant: QUALCOMM Incorporated, San Diego, CA (US)

(72) Inventors: Wei Liu, Beijing (CN); Thomas Joseph Richardson, South Orange, NJ (US); Liangming Wu, Beijing (CN); Changlong Xu, Beijing (CN); Ori Shental, Marlboro, NJ (US); Hao Xu, Beijing (CN)

(73) Assignee: QUALCOMM INCORPORATED, San Diego, CA (US)

( * ) Notice: Subject to any disclaimer, the term of this patent is extended or adjusted under 35 U.S.C. 154(b) by 78 days.

(21) Appl. No.: 19/105,327

(22) PCT Filed: Sep. 1, 2022

(86) PCT No.: PCT/CN2022/116435

§ 371 (c)(1),
(2) Date: Feb. 20, 2025

(87) PCT Pub. No.: WO2024/045107

PCT Pub. Date: Mar. 7, 2024

(65) Prior Publication Data

US 2026/0058754 A1 Feb. 26, 2026

(51) Int. Cl.
*H04L 1/00* (2006.01)

(52) U.S. Cl.
CPC .......... *H04L 1/0042* (2013.01); *H04L 1/0047* (2013.01)

(58) Field of Classification Search
CPC ............................ H04L 1/0042; H04L 1/0047
See application file for complete search history.

(56) References Cited

U.S. PATENT DOCUMENTS 10,749,554 B1 * 8/2020 Millar ...................... H04B 1/10
2003/0007577 A1 * 1/2003 Shiu ................. H03M 13/2957 714/794
2019/0342138 A1 11/2019 Böcherer et al.

FOREIGN PATENT DOCUMENTS

EP 3767457 A1 1/2021
WO 2018121887 A1 7/2018
WO 2021055411 A1 3/2021
WO 2021101901 A1 5/2021

OTHER PUBLICATIONS

International Search Report and Written Opinion—PCT/CN2022/116435—ISA/EPO—Apr. 21, 2023.
Pikus M., et al., "Arithmetic Coding Based Multi-Composition Codes for Bit-Level Distribution Matching", arXiv:1904.01819v2 [cs.IT], May 3, 2019, 6 Pages.

* cited by examiner

*Primary Examiner* — Thien Nguyen
(74) *Attorney, Agent, or Firm* — Harrity & Harrity, LLP

(57) ABSTRACT

This disclosure provides methods, devices and systems for encoding data, to achieve a symbol distribution, for wireless communication. One implementation includes a method in which arithmetic coding (AC) encoding is constrained by a set of one or more target compositions for symbol sequences. The target compositions are known, and the encoding method is performed in multiple iterations. Each iteration generates a symbol and establishes a composition prefix, which is taken into account in the subsequent iteration. The methods generate output sequences defining symbols that are used to encode data for transmission.

20 Claims, 15 Drawing Sheets

ARITHMETIC CODING INCLUDING SYMBOL SEQUENCE DETERMINATION

CROSS-REFERENCE TO RELATED APPLICATION

This application is a 371 National Stage of PCT Application No. PCT/CN2022/116435, filed on Sep. 1, 2022, entitled "ARITHMETIC CODING INCLUDING SYMBOL SEQUENCE DETERMINATION," and assigned to the assignee hereof. The disclosure of the prior Application is considered part of and is incorporated by reference into this Patent Application.

TECHNICAL FIELD

This disclosure relates generally to wireless communication, and more specifically, to encoding and decoding data to achieve a symbol distribution of a transmitted or received signal.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Furthermore, as wireless communication becomes cheaper and more reliable, expectations among consumers change.

Transmitting and receiving devices may support the use of various modulation and coding schemes (MCSs) to transmit and receive data so as to optimally take advantage of wireless channel conditions, for example, to increase throughput, reduce latency, or enforce various quality of service (QoS) parameters. For example, existing technology supports the use of up to 1024-QAM and it is expected that 4096-QAM (also referred to as "4k QAM") will also be implemented.

As communication protocols get more complex, there is a need in the art for encoding and decoding schemes that are efficient in terms of processing, storage, and energy use.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One aspect includes a method of wireless communication by a wireless communication device. The method includes generating a plurality (k) of information bits, where k is an integer greater than 1. The method also includes performing an encoding operation on the plurality of information bits, the encoding operation having a plurality of iterations and is constrained by a length (n) and a set of one or more target compositions of a plurality of sequences, the encoding operation including: in a first iteration, calculating a first plurality of transition probabilities corresponding to a first plurality of prefix compositions; in the first iteration, selecting a first symbol corresponding to a first prefix composition within the first plurality of prefix compositions based at least in part on the first plurality of transition probabilities; in a second iteration, calculating a second plurality of transition probabilities corresponding to a second plurality of prefix compositions, where the second plurality of prefix compositions represents a remaining subset of the plurality of sequences associated with the first prefix composition; in the second iteration, selecting a second symbol corresponding to a second prefix composition within the second plurality of prefix compositions based at least in part on the second plurality of transition probabilities. The method also includes transmitting a wireless packet to at least one receiving device based on a sequence of length n, which is generated from the plurality of iterations, where n is equal to a total quantity of the plurality of iterations, further where the sequence may include the first symbol and the second symbol.

Another aspect includes a wireless communication device with at least one modem. The device also includes at least one processor coupled with the at least one modem. The device also includes at least one memory coupled with the at least one processor and storing processor-readable code that, when executed by the at least one processor in conjunction with the at least one modem, is configured to perform an encoding operation on a plurality of information bits, the encoding operation having a plurality of iterations and is constrained by a length (n) and a set of one or more target compositions of a plurality of sequences, the encoding operation including: in a first iteration, calculate a first plurality of transition probabilities corresponding to a first plurality of prefix compositions, where a given transition probability of the first plurality of transition probabilities is proportional to a first weighted sum of a first plurality of multinomial coefficients, wherein each multinomial coefficient of the first plurality of multinomial coefficients corresponds to a difference between a first respective target composition of the set of one or more target compositions and a given prefix composition of the first plurality of prefix compositions; in the first iteration, select a first symbol corresponding to a first prefix composition within the first plurality of prefix compositions based at least in part on the first plurality of transition probabilities; perform further iterations of the plurality of iterations; and transmit a wireless packet to at least one receiving device based on a sequence of length n, which is generated from the plurality of iterations, where n is equal to a total quantity of the plurality of iterations, further where the sequence may include the first symbol.

Another aspect includes a non-transitory computer-readable medium having program code recorded thereon for wireless communication by a wireless communication device. The non-transitory computer-readable medium includes code for performing an encoding operation on a plurality of information bits, the encoding operation having a plurality of iterations and is constrained by a sequence length and a set of one or more target compositions of a plurality of sequences, the encoding operation including: in a first iteration, calculating a first plurality of transition probabilities corresponding to a first plurality of prefix compositions; in the first iteration, selecting a first symbol corresponding to a first prefix composition within the first plurality of prefix compositions based at least in part on the first plurality of transition probabilities; in a second iteration, calculating a second plurality of transition probabilities corresponding to a second plurality of prefix compositions, where the second plurality of prefix compositions represents a remaining subset of the plurality of sequences associated with the first prefix composition; in the second iteration, selecting a second symbol corresponding to a second prefix composition within the second plurality of prefix compositions based at least in part on the second plurality of transition probabilities; and code for transmitting a wireless packet to at least one receiving device based on an output sequence conforming to the sequence length, wherein the output sequence is generated from the plurality of iterations, and where the output sequence may include the first symbol and the second symbol within a plurality of symbols.

Another aspect includes a wireless communication device configured to encode a plurality of information bits. The wireless communication device includes means for, in a first iteration, calculating a first plurality of transition probabilities corresponding to a first plurality of prefix compositions, wherein a given transition probability of the first plurality of transition probabilities is proportional to a first weighted sum of a first plurality of multinomial coefficients, wherein each multinomial coefficient of the first plurality of multinomial coefficients corresponds to a difference between a first respective target composition of a set of one or more target compositions and a given prefix composition of the first plurality of prefix compositions. The device also includes means for, in the first iteration, selecting a first symbol corresponding to a first prefix composition within the first plurality of prefix compositions based at least in part on the first plurality of transition probabilities. The device also includes means for performing further iterations of a plurality of iterations. The device also includes means for transmitting a wireless packet to at least one receiving device based on an output sequence of length n, which is generated from the plurality of iterations, where n is equal to a total quantity of the plurality of iterations, further where the output sequence may include the first symbol.

BRIEF DESCRIPTION OF THE DRAWINGS

Like reference numbers and designations in the various drawings indicate like elements.

DETAILED DESCRIPTION

Figure 1:
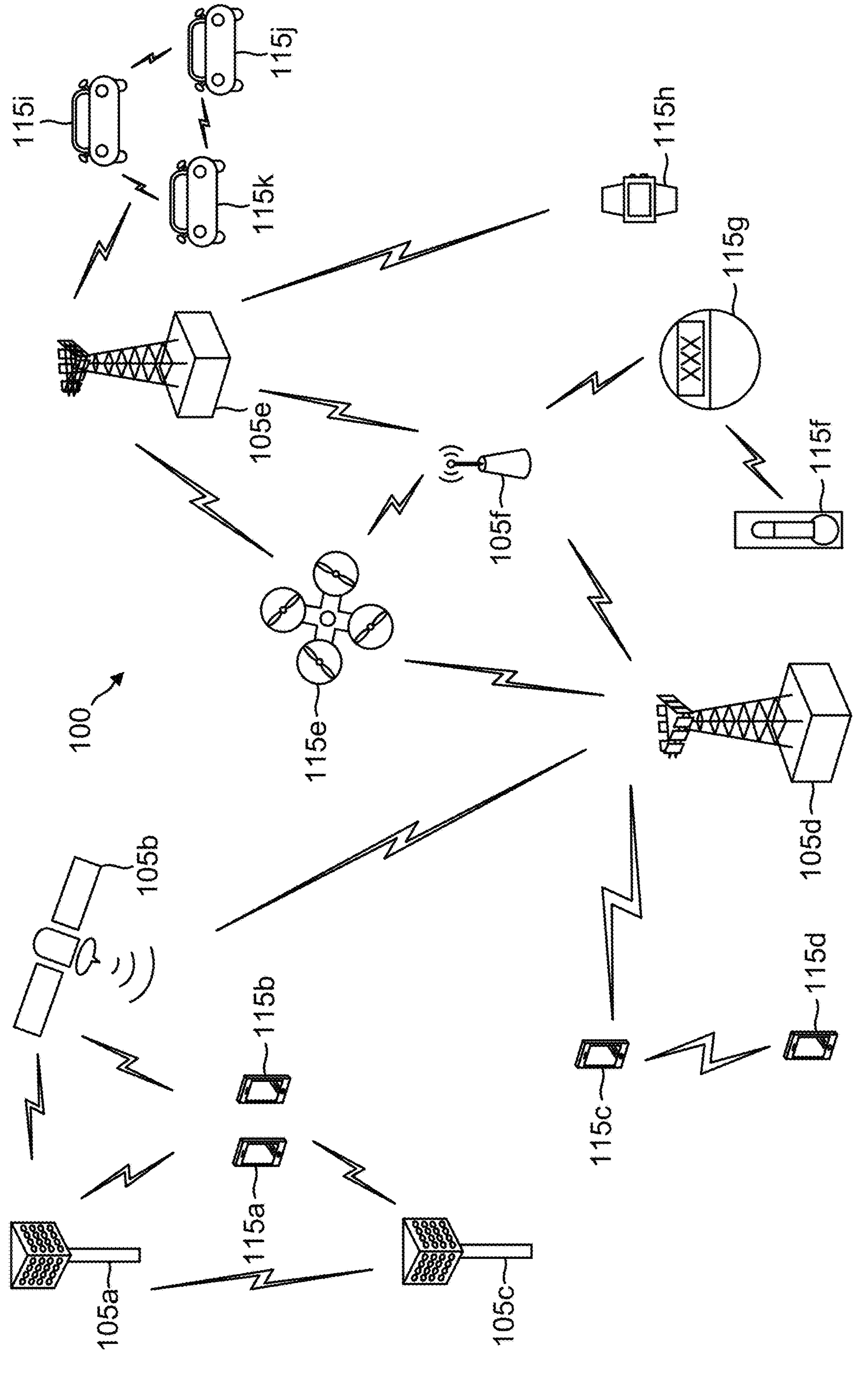
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. This disclosure relates generally to wireless communications systems, also referred to as wireless communications networks. In various aspects, the methods and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, Institute of Electrical and Electronics Engineers (IEEE) 802.11 standards, as well as other communications networks. As described herein, the terms "networks" and "systems" may be used interchangeably.

In current wireless communication systems, higher-order modulation (e.g., 16QAM, 64QAM and 256QAM) are used. The constellations in these systems are fixed and each constellation point is used with equal probability. Over an additive white Gaussian noise (AWGN) channel, the capacity is achievable if the input distribution is a Gaussian distribution. A difference between the signal-to-noise (SNR) to achieve a rate with a given coding and modulation scheme and the SNR at which an optimal capacity-achieving scheme could operate at the same rate is referred to as the shaping gap. For an AWGN channel, the shaping gap can be asymptotically equal to about 1.53 dB when the channel inputs are uniformly distributed. Existing techniques to reduce or close the shaping gap include geometric shaping and probabilistic shaping. Geometric shaping implements equiprobable signaling with Gaussian-like distributed constellation points. Probabilistic shaping employs equidistant constellation points and implements non-uniform (e.g., Gaussian-like) signal distribution.

Traditional approaches to probabilistic shaping include trellis shaping and shell mapping. Probabilistic amplitude shaping (PAS) is another technique to perform probabilistic shaping, and it may combine an outer layer of shaping with an inner layer of binary forward-error-correction (FEC) so that it can provide a low-complexity and flexible integration with existing bit-interleaved coded modulation (BICM) schemes. A PAS scheme may implement amplitude-shift keying (ASK) constellations, e.g., by providing quadrature amplitude modulation (QAM) constellations by mapping two ASK symbols to one QAM symbol. PAS may provide large shaping gain and inherent rate adaptation functionality.

This disclosure provides methods, devices, and systems for encoding data for wireless communication to achieve a desired amplitude distribution. A proposed arithmetic coding (AC) encoding method may be used to perform distribution matching in a PAS scheme. One example includes an AC encoding method that is constrained by a sequence length and a set of one or more target compositions. The AC encoding method may be performed using multiple (n) iterations, where n is an integer that corresponds to the sequence length. The set of one or more target compositions may be determined beforehand and may be based, e.g., on simulation or testing that indicates that the target compositions are expected to provide desirable performance in a wireless communication device. In a first iteration, the AC encoding method calculates a first plurality of transition probabilities for a first plurality of prefix compositions. The first iteration may also include selecting a first amplitude symbol of the sequence, corresponding to a first prefix composition, based at least in part on the transition probabilities and a uniform random variable (e.g., a number generated from a set of input information bits). Once the first amplitude symbol of the sequence is determined, that establishes a prefix of the sequence and the first prefix composition. The transition probabilities may then be updated to account for the first amplitude symbol being known and the possible prefix compositions that may be reached from the first prefix composition. Subsequent iterations may be performed to determine the remaining amplitude symbols, one iteration per amplitude symbol. A proposed AC decoding method can be used to perform distribution dematching in a PAS scheme.

Various implementations can be viewed as an efficient method to realize distribution matching and dematching. For instance, the various implementations may be more energy efficient by using the set of one or more target compositions as a constraint. Furthermore, limiting the calculations to a target set of compositions may reduce the computing burden of determining the amplitude symbols, thereby reducing computing burden and power use overall.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof, and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (FR2). FR1 bands include frequency bands at 7 GHz or lower (e.g., between about 410 MHz to about 7125 MHz). FR2 bands include frequency bands in mmWave ranges between about 24.25 GHz and about 52.6 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates a wireless communication network 100 according to some aspects of the present disclosure. The network 100 may be a 5G network. The network 100 includes a number of base stations (BSs) 105 (individually labeled as **105*a*, 105*b*, 105*c*, 105*d*, 105*e*, and 105*f*) and other network entities. A BS 105 may be a station that communicates with UEs 115 (individually labeled as 115*a*, 115*b*, 115*c*, 115*d*, 115*e*, 115*f*, 115*g*, 115*h*, and 115*k*) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105** and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs **105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105** may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs **115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115**.

In operation, the BSs **105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d***. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support communications with ultra-reliable and redundant links for devices, such as the UE **115*e*, which may be airborne. Redundant communication links with the UE 115*e* may include links from the macro BSs 105***d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-action-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of SSBs and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the IE 115 may transmit a HARQ NACK to the BS 105. Upon receiving a HARQ NACK from the UE 115, the BS 105 may retransmit the DL data packet to the UE 115. The BS 105 and the UE 115 may also apply HARQ for UL communications using substantially similar mechanisms as the DL HARQ.

In some aspects, a UE 115 and a BS 105 may be capable of encoding and decoding information according to the AC methods described herein, such as in FIGS. 6-14A and 14B.

Figure 2:
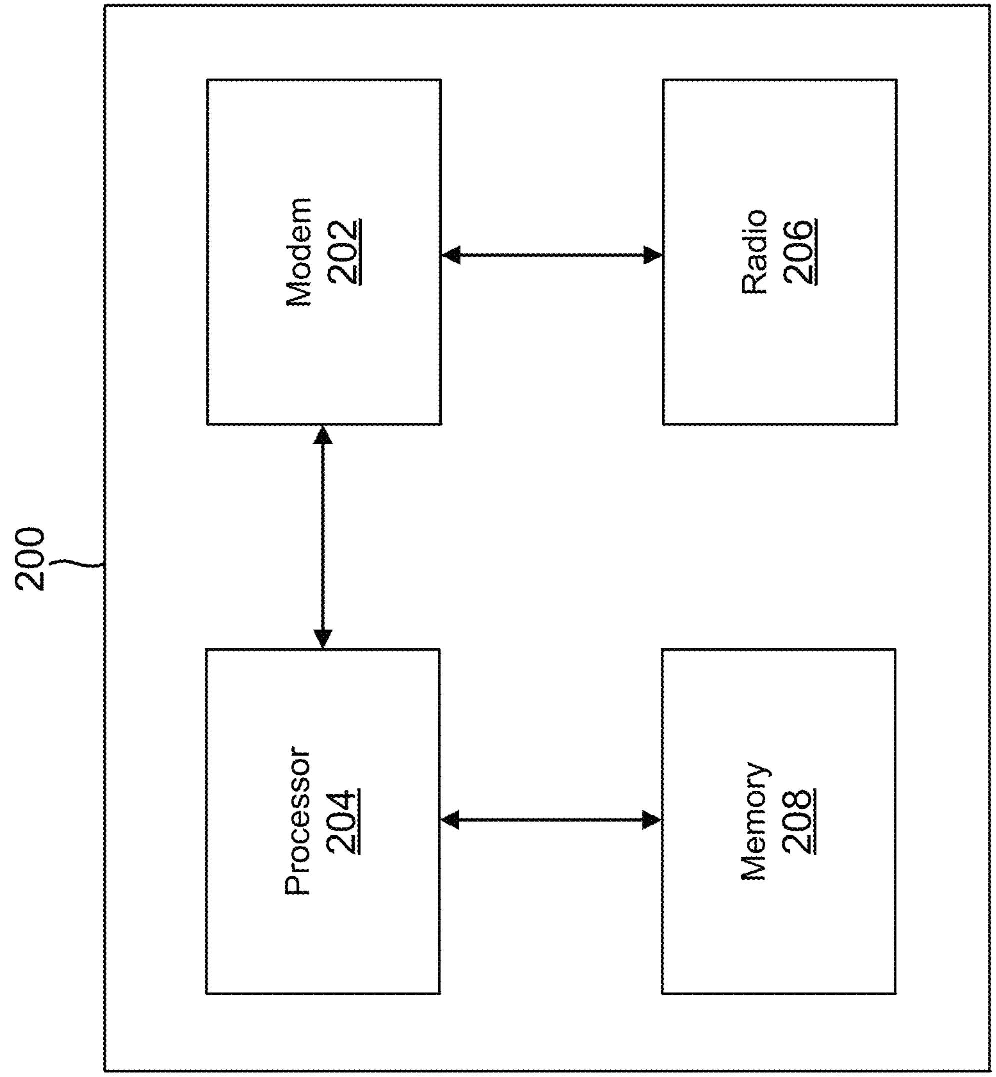
FIG. 2 shows a block diagram of an example wireless communication.

FIG. 2 shows a block diagram of an example wireless communication device 200. In some implementations, the wireless communication device 200 can be an example of a device for use in a UE such as one of the UEs 115 described above with reference to FIG. 1. In some implementations, the wireless communication device 200 can be an example of a device for use in a BS such as the BSs 105 described above with reference to FIG. 1. The wireless communication device 200 is capable of transmitting and receiving wireless communications in the form of, for example, wireless packets.

The wireless communication device 200 can be, or can include, a chip, system on chip (SoC), chipset, package or device that includes one or more modems 202, for example, a 3GPP 4G LTE or 5G compliant modem. In some implementations, the one or more modems 202 (collectively "the modem 202") additionally include a Wi-Fi (IEEE 802.11 compliant) modem. In some implementations, the wireless communication device 200 also includes one or more processors, processing blocks or processing elements 204 (collectively "the processor 204") coupled with the modem 202. In some implementations, the wireless communication device 200 additionally includes one or more radios 206 (collectively "the radio 206") coupled with the modem 202. In some implementations, the wireless communication device 200 further includes one or more memory blocks or elements 208 (collectively "the memory 208") coupled with the processor 204 or the modem 202.

The modem 202 can include an intelligent hardware block or device such as, for example, an application-specific integrated circuit (ASIC), among other examples. The modem 202 is generally configured to implement a PHY layer, and in some implementations, also a portion of a MAC layer (for example, a hardware portion of the MAC layer). For example, the modem 202 is configured to modulate packets and to output the modulated packets to the radio 206 for transmission over the wireless medium. The modem 202 is similarly configured to obtain modulated packets received by the radio 206 and to demodulate the packets to provide demodulated packets. In addition to a modulator and a demodulator, the modem 202 may further include digital signal processing (DSP) circuitry, automatic gain control (AGC) circuitry, a coder, a decoder, a multiplexer and a demultiplexer. For example, while in a transmission mode, data obtained from the processor 204 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 206. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 206, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be provided to the MAC layer (the processor 204) for processing, evaluation or interpretation.

The radio 206 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 200 can include, or be coupled with, multiple transmit antennas (each with a corresponding transmit chain) and multiple receive antennas (each with a corresponding receive chain). The symbols output from the modem 202 are provided to the radio 206, which then transmits the symbols via the coupled antennas. Similarly, symbols received via the antennas are obtained by the radio 206, which then provides the symbols to the modem 202.

The processor 204 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 204 processes information received through the radio 206 and the modem 202, and processes information to be output through the modem 202 and the radio 206 for transmission through the wireless medium. For example, the processor 204 may implement a control plane and at least a portion of a MAC layer configured to perform various operations related to the generation, transmission, reception and processing of packets. In some implementations, the MAC layer is configured to generate packets for provision to the PHY layer for coding, and to receive decoded information bits from the PHY layer for processing as packets. The MAC layer may further be configured to allocate time and frequency resources, for example, for OFDMA, among other operations or techniques. In some implementations, the processor 204 may generally control the modem 202 to cause the modem to perform various operations described above.

The memory 208 can include tangible storage media such as random-access memory (RAM) or read-only memory (ROM), or combinations thereof. The memory 208 also can store non-transitory processor- or computer-executable software (SW) code containing instructions that, when executed by the processor 204, cause the processor to perform various operations described herein for wireless communication, including the generation, transmission, reception and interpretation of frames or packets. For example, various functions of components disclosed herein, or various blocks or steps of a method, operation, process or algorithm disclosed herein, can be implemented as one or more modules of one or more computer programs.

Figure 3:
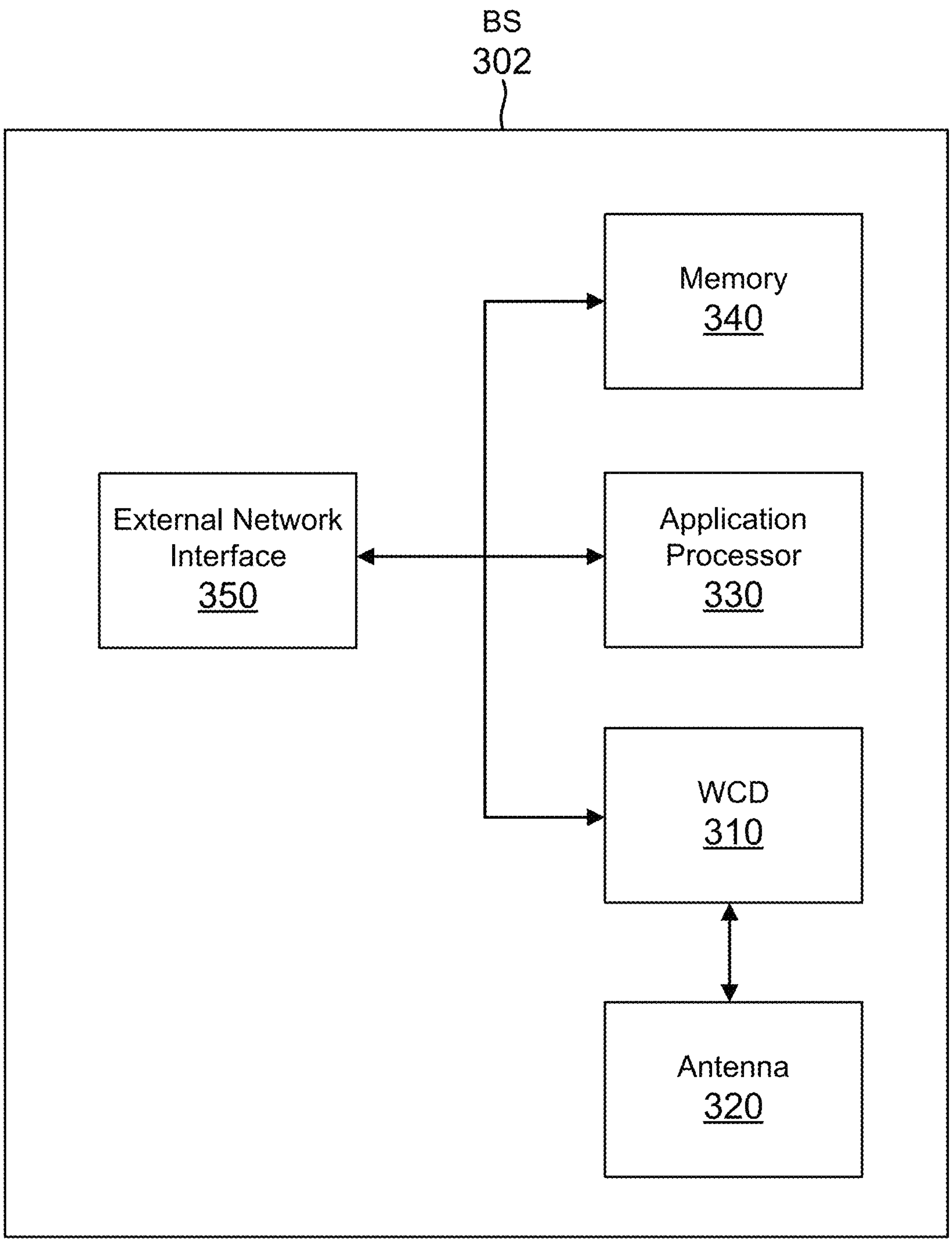
FIG. 3 shows a diagram of an example base station.

FIG. 3 shows a block diagram of an example BS 302. For example, the BS 302 can be an example implementation of the BS 105 described with reference to FIG. 1. The BS 302 includes a wireless communication device (WCD) 310 (although the BS 302 may itself also be referred to generally as a wireless communication device as used herein). For example, the wireless communication device 310 may be an example implementation of the wireless communication device 200 described with reference to FIG. 2. The BS 302 also includes multiple antennas 320 coupled with the wireless communication device 310 to transmit and receive wireless communications. In some implementations, the BS 302 additionally includes an application processor 330 coupled with the wireless communication device 310, and a memory 340 coupled with the application processor 330. The BS 302 further includes at least one external network interface 350 that enables the BS 302 to communicate with a core network or backhaul network to gain access to external networks including the Internet. For example, the external network interface 350 may include one or both of a wired (for example, Ethernet) network interface and a wireless network interface. Ones of the aforementioned components can communicate with other ones of the components directly or indirectly, over at least one bus. The BS 302 further includes a housing that encompasses the wireless communication device 310, the application processor 330, the memory 340, and at least portions of the antennas 320 and external network interface 350.

Figure 4:
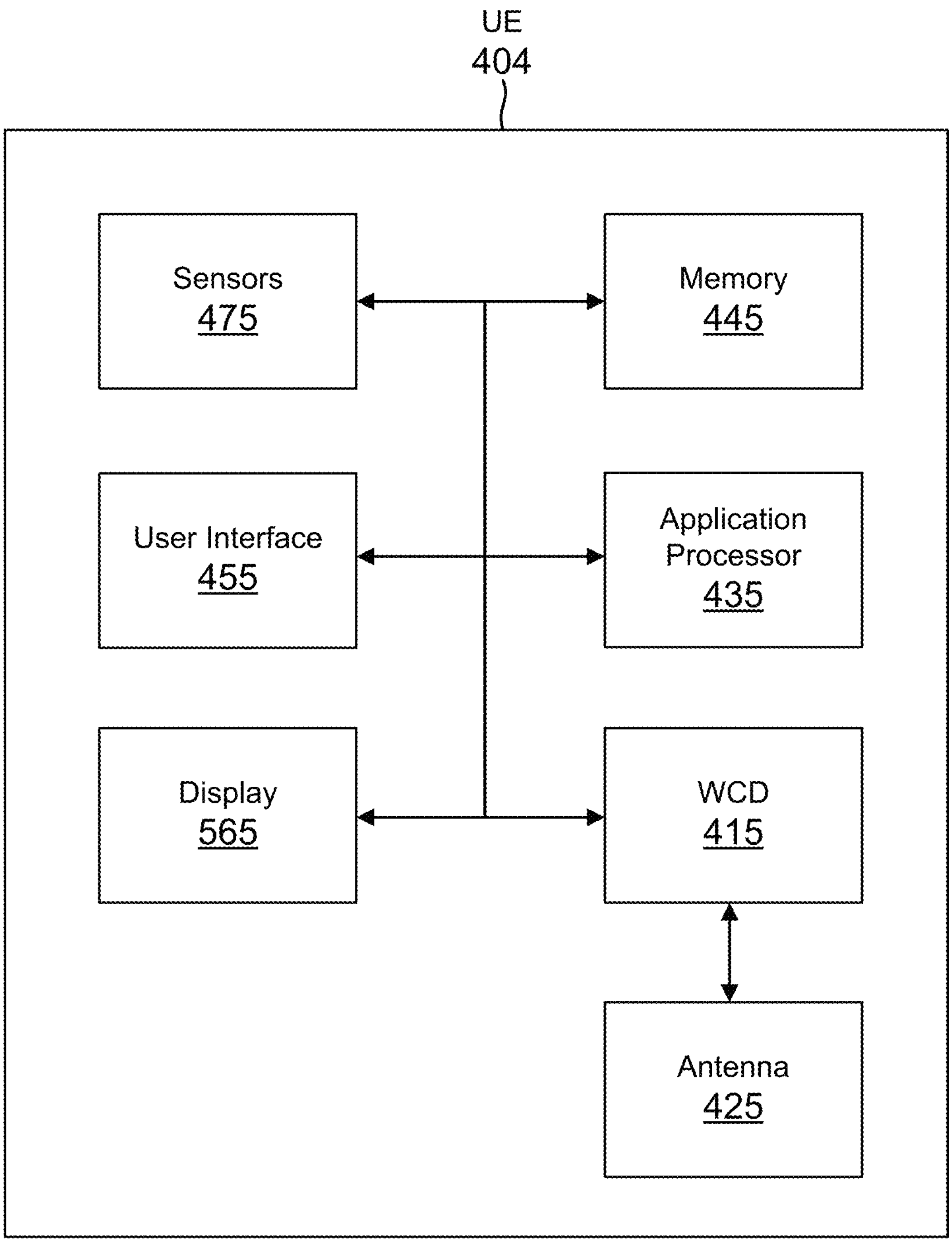
FIG. 4 shows a diagram of an example user equipment.

FIG. 4 shows a block diagram of an example UE 304. For example, the UE 304 can be an example implementation of the UE 115 described with reference to FIG. 1. The UE 304 includes a wireless communication device 415 (although the UE 304 may itself also be referred to generally as a wireless communication device as used herein). For example, the wireless communication device 415 may be an example implementation of the wireless communication device 200 described with reference to FIG. 2. The UE 304 also includes one or more antennas 425 coupled with the wireless communication device 415 to transmit and receive wireless communications. The UE 304 additionally includes an application processor 435 coupled with the wireless communication device 415, and a memory 445 coupled with the application processor 435. In some implementations, the UE 304 further includes a user interface (UI) 455 (such as a touchscreen or keypad) and a display 465, which may be integrated with the UI 455 to form a touchscreen display. In some implementations, the UE 304 may further include one or more sensors 475 such as, for example, one or more inertial sensors, accelerometers, temperature sensors, pressure sensors, or altitude sensors. Ones of the aforementioned components can communicate with other ones of the components directly or indirectly, over at least one bus. The UE 304 further includes a housing that encompasses the wireless communication device 415, the application processor 435, the memory 445, and at least portions of the antennas 425, UI 455, and display 465.

General Context for Probabilistic Amplitude Shaping

Figure 5:
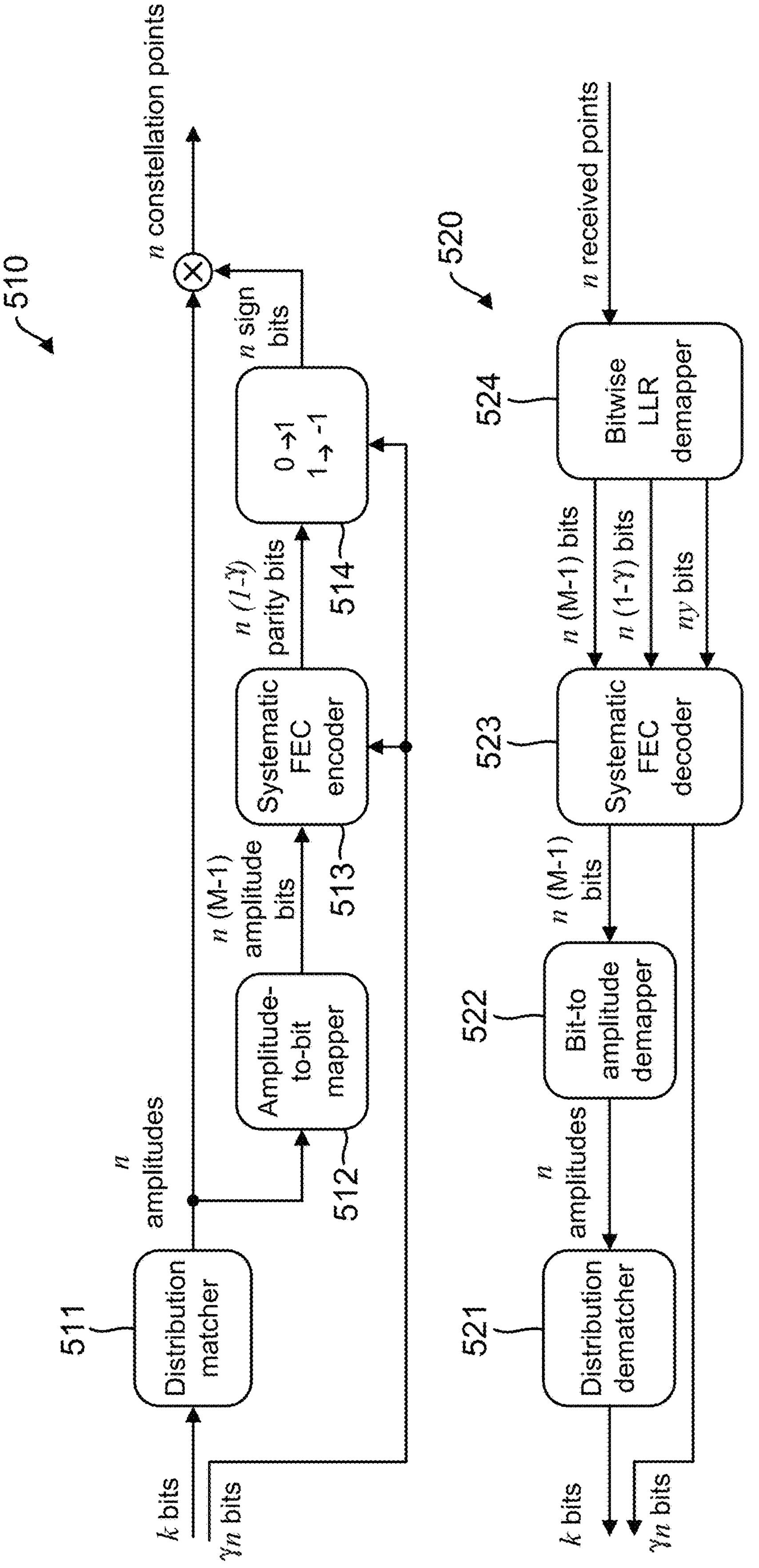
FIG. 5 shows an example transmitter chain and an example receiver chain of an architecture for probabilistic amplitude shaping (PAS).

FIG. 5 illustrates an example transmitter chain 510 and an example receiver chain 520 of an architecture for probabilistic amplitude shaping (PAS), according to one implementation. For instance, the transmitter chain 510 and the receiver chain 520 may be implemented within the wireless communication device 200 of FIG. 2. The transmitter chain 510 includes a distribution matcher 511 as well as a forward-error-correction (FEC) chain having mapper 512, FEC encoder 513, and sign module 514. The AC encoding and decoding methods discussed herein may be implemented by a device conforming to the architecture of FIG. 5, though the scope of implementations is not limited to that architecture. The AC encoding method disclosed herein can be used to perform a distribution matching task (e.g., at the distribution matcher 511) in that system, and the AC decoding method disclosed herein can be used to perform a distribution dematching task (e.g., at the distribution dematcher 521).

The receiver chain 520 includes a distribution de-matcher 521, a de-mapper 522, FEC decoder 523, and bitwise logarithm likelihood ratio (LLR) de-mapper 524. Example implementations provide for encoding and decoding using AC methods. In some examples, the AC encoding method may be performed using the distribution matcher 511, and the AC decoding method may be performed using the distribution de-matcher 521.

The example of FIG. 5 uses $2^M$-ary amplitude shifting keying (ASK) constellation $\{\pm1, \pm3, \ldots, \pm(2^M-1)\}$ with amplitude alphabet $A=\{1, 3, \ldots, 2^M-1\}$. The n(M−1) amplitude bits and the γn information bits together constitute the n(M−1+γ) bits as input to the systematic FEC encoder, which then generates n(1−γ) parity bits. These n(1−γ) parity bits together with the γn information bits are converted to n sign bits and are pointwise multiplied with the n amplitudes from the output of the distribution matcher. The distribution matching (DM) rate is $R_{dm}=k/n$, the systematic forward-error-correction (FEC) code rate is $R_c=(M-1+\gamma)/M$, and the transmission rate is $R_t=R_{dm}+\gamma$, where γn is a number of additional information bits added for FEC.

The present example uses a fixed-to-fixed DM at the distribution matcher 511 to map a length-k bit sequence to a length-n amplitude sequence, and it induces a non-uniform marginal distribution over the amplitude symbols $\{1, 3, \ldots, 2^M-1\}$. The k bits are typically assumed to be independent and identically distributed (i.i.d.) with the uniform distribution. However, the non-uniform distribution over the amplitude symbols is expected to be closer to the capacity-achieving distribution than the uniform one, e.g., being more Gaussian-like or being a Maxwell-Boltzmann distribution in the AWGN setting.

Symbol Terminologies and Nomenclatures

Before getting into examples of arithmetic coding (AC) being performed, it is instructive to look at mathematical functions that may be applied to data for the purpose of transmitting and receiving encoded data. The following paragraphs introduce concepts that underpin the AC encoding and decoding methods described with respect to FIGS. 6-14A and 14B.

For example, an alphabet may define possible amplitude symbols, and it may be given the symbolic notation $\mathcal{A}_m$. For example, if m>1 is an integer, then $\mathcal{A}_m=\{a_1, a_2, \ldots, a_m\}$ is a symbol alphabet of size m. Examples impose an ordering< on the alphabet $\mathcal{A}_m$ such that $a_i<a_{i+1}$ for each i, i.e., $a_1<a_2< \ldots <a_m$. For a given m and for each integer t between 1 and m, $\mathcal{A}_t$ is the subset of q consisting of symbol $a_i$ for all i≤t. In other words, $\mathcal{A}_t=\{a_i\in \mathcal{A}_m | i\leq t\}$ expresses a general relation between alphabet $\mathcal{A}_m$ and alphabets $\mathcal{A}_t$ for t≤m.

An example application of an alphabet is in the context of amplitude-shift keying (ASK) constellations. One example includes the symbol (i.e., amplitude) alphabet $\mathcal{A}_m=\{1, 3, \ldots, 2^M-1\}$ so that $m=2^{M-1}$ and $\{-1, 1\}\times\mathcal{A}_m$ corresponds to a $2^M$-ary ASK alphabet (this means that m depends on a modulation order). For instance, for 8-ASK, M=3 and the alphabets $\mathcal{A}_4=\{1, 3, 5, 7\}$, $\mathcal{A}_3=\{1, 3, 5\}$, $\mathcal{A}_2=\{1, 3\}$ and $\mathcal{A}_1=\{1\}$.

A sequence over $\mathcal{A}_m$ and having length n is an ordered n-tuple, each element of which takes values in $\mathcal{A}_m$. Disclosure herein may refer to "sequences over $\mathcal{A}_m$ and having length n". By "over $\mathcal{A}_m$" it is meant each element (i.e., symbol) of an involved sequence belongs to the alphabet $\mathcal{A}_m$. For a positive integer n, disclosure herein may denote by [n] the set $\{0, 1, \ldots, n\}$ of all integers between 0 and n. In one example sequence, m=2 and n=4, and the symbol sequences of length 4 over $\mathcal{A}_2=\{1, 3\}$. In some example wireless applications, m may be relatively small while n may be relatively large.

A composition $\vec{k}$ of length m and over [n] is an ordered m-tuple $\vec{k}=(k_1, k_2, \ldots, k_m)$, all elements of which are nonnegative and sum up to n. Given a composition $\vec{k}$, $k_i(\vec{k})$ is the element of $\vec{k}$ along coordinate i. In another words, $k_i(\vec{k})$ is the i-th element of $\vec{k}$. Examples described herein may denote by $n(\vec{k})$ the sum of all elements of $\vec{k}$, and may denote by $\mathcal{N}(\vec{k})$ the multinomial coefficient associated with $\vec{k}$:

$$\mathcal{N}(\vec{k}) = \binom{n(\vec{k})}{\vec{k}} = \frac{n(\vec{k})!}{\prod_{i=1}^{m} k_i!}. \quad (1)$$

Given a sequence s of length n and over $\mathcal{A}_m$, the composition of s is an ordered m-tuple, $\vec{k}(s)=(k_1(s), k_2(s), \ldots, k_m(s))$, where for each i, $k_i(s)$ is the number of occurrences of $a_i\in\mathcal{A}_m$ in the sequence s.

An illustrative example of a sequence includes s=(1, 1, 3, 1), and the prefix $$s_1^2 = (1, 1).$$

The composition of sequence s=(1, 1, 3, 1) is $\vec{k}(s)=(3, 1)$. The element 3 indicates three occurrences of the symbol amplitude 1 in the sequence. The element 1 indicates one occurrence of the symbol amplitude 3 in the sequence. The number of sequences having composition (3, 1) is equal to 4. The sequences over $\mathcal{A}_2$ and having composition (3,1) are (1, 1, 1, 3), (1, 1, 3, 1), (1, 3, 1, 1) and (3, 1, 1, 1). Of course, these examples of an alphabet, sequence, and a composition are for illustration, and it is understood that the scope of embodiments is not limited to any size of alphabet or size of sequence.

Furthermore, though the methods discussed herein may be applied to probabilistic amplitude shaping (PAS), the methods are not restricted to PAS, such as in FIG. 5. For instance, the symbol alphabet may be energy-based or not. Thus, while some examples may refer to amplitude symbols, the scope of implementations may be applied to symbols that do not necessarily correspond to energies. Sequences conforming to a particular composition would be expected to have a same energy, at least in implementations using amplitude symbols. Therefore, defining a set of one or more target compositions may implicitly constrain any output amplitude symbol to the energies that would be associated with the one or more target compositions. However, various implementations described herein do not explicitly use energy as a constraint when calculating amplitude symbols. Rather, various implementations described herein constrain the selection of amplitude symbols to the target compositions, iteration by iteration, each subsequent iteration taking into account those symbols that have already been calculated.

The Q Function

The implementations described herein use a Q function (described in further detail below), which represents a weighted sum of multinomial coefficients. The Q function may be used to calculate transition probabilities, also explained in further detail below.

The notation $\mathcal{K}$ (m, n) represents a set of N distinct compositions of length m and over [n] and may also be denoted by: $\mathcal{K}(m, n)=\{\vec{k}_{T_2}, \vec{k}_{T_2}, \ldots, \vec{k}_{T_N}\}$, where N is an integer great than 0. Any element of $\mathcal{K}$ (m, n) is referred to as a target composition, and the target compositions may be selected either ahead of time or during the encoding operation and designated as a target composition. A given target composition may be denoted as $\vec{k}_T$. While an example described herein use two target compositions for ease of illustration, it is understood that a deployed wireless application may designate tens or hundreds of target compositions. In other words, the scope of implementations is not limited to any particular target compositions nor to any particular number of target compositions.

Various implementations may use a function R to apply weighting to the multinomial coefficients. The function R (described in more detail below) is a real-valued function over the set of target compositions $\mathcal{K}$ (m, n).

A prefix composition of length m and over [n] is an ordered m-tuple, all elements of which are nonnegative and sum up to an integer that is smaller than or equal to n. Examples described herein may denote by $n(\vec{k})$ the sum of all elements of a prefix composition $\vec{k}$. The prefix composition $\vec{k}$ satisfies $n(\vec{k}) \leq n$. In other words, the notation $\vec{k}$ represents a composition of a prefix, where a prefix represents a less than complete sequence. For instance, a first iteration of encoding may generate a first amplitude symbol, and the prefix may then include the first amplitude symbol. As subsequent amplitude symbols are generated, the prefix increases in length and is referred to as the sequence when it reaches a length n. Each of those prefixes corresponds to a prefix composition, i.e., the composition corresponding to that particular prefix.

For a set of target compositions $\mathcal{K}$ (m, n) and a function R on $\mathcal{K}$ (m, n), the disclosure described herein defines a Q function on the set of all prefix compositions of length m and over [n]. For a given prefix composition length m and over [n], the Q function evaluated at the prefix composition is a weighted sum of one or more multinomial coefficients, where the one or more weights are determined by the function R on $\mathcal{K}$ (m, n). Each one of the one or more multinomial coefficients corresponds to a difference between a respective target composition in $\mathcal{K}$ (m, n) and the prefix composition. The Q function evaluated at a prefix composition $\vec{k}$ of length m and over [n] is defined in accordance with the following Equation (2):

$$Q(\vec{k}) = \sum_{\vec{k}_T \in \mathcal{K}(m,n)} R(\vec{k}_T)\begin{pmatrix} n(\vec{k_T - \vec{k}}) \\ \vec{k} - \vec{k} \end{pmatrix}. \tag{2}$$

It is understood that, for any $\vec{k}_T \in \mathcal{K}$ (m,n) and any prefix composition $\vec{k}$ of length m and over [n], if any element of the difference $\vec{k}_T - \vec{k}$ is negative, then the associated multinomial coefficient in Equation (2) evaluates to 0.

Various implementations described herein may use the notation $\mathcal{D}(\vec{k})$ to represent elements that can be written as $\vec{k}' = \vec{k} + \vec{e}_i$ for some $i \in \{1, 2, \ldots, m\}$ and the standard basis vector $\vec{e}_i \in \mathbb{R}^m$. The notation $\vec{e}_i$ represents the change to a prefix when a subsequent amplitude symbol is generated. The Q function satisfies the recursion:

$$Q(\vec{k}) = \sum_{\vec{k}' \in \mathcal{D}(\vec{k})} Q(\vec{k}'). \tag{3}$$

A probability distribution P over $\mathcal{K}$ (m, n) may be defined in the AC encoding method. The notation $\mathcal{S}(m, n, \mathcal{K})$ represents the set of all sequences (over $\mathcal{A}_m$) having length n, each of which has composition belonging to $\mathcal{K}$ (m, n). The probability distribution P induces a probability distribution $\mathbb{P}_P$ over the set $\mathcal{S}(m, n, \mathcal{K})$, i.e., for $s \in \mathcal{S}(m, n, \mathcal{K})$, there is a defined probability distribution:

$$\mathbb{P}_P(s) = \frac{P(\vec{k}(s))}{\mathcal{N}(\vec{k}(s))}. \tag{4}$$

The probability distribution $\mathbb{P}_P$ has the property that all sequences having the same composition have the same probability—a permutation invariance property. Disclosure herein may associate a function R on $\mathcal{K}$ (m, n) to the probability distribution P, and the function R is defined such that, for a composition $\vec{k}_T \in \mathcal{K}$ (m, n), the following is true:

$$R(\vec{k}_T) = \frac{P(\vec{k}_T)}{\mathcal{N}(\vec{k}_T)}. \tag{5}$$

The function value $R(\vec{k}_T)$ in accordance with Equation (5) can be interpreted as the probability that a sequence in $\mathcal{S}(m, n, \mathcal{K})$ has composition $\vec{k}_T \in \mathcal{K}$ (m, n). If $P(\vec{k}_T)/\mathcal{N}(\vec{k}_T)$ are all equal, then $R(\vec{k}_T)$ can be set to be equal to 1. This is because, for the AC encoding method examples described herein, it is the ratios of Q that are used for determining transition probabilities. For example, if $\mathcal{K}(m, n)=\{\vec{k}_T\}$ consists of a single composition $\vec{k}_T$, then $R(\vec{k}_T)=1$.

The AC Encoding Method

The AC encoding method described herein has access to $\mathcal{K}$ (m, n), which is a set of compositions of length m and over [n], as well as access to a probability distribution P over $\mathcal{K}$ (m, n). The AC encoding method also has access to the function R, over $\mathcal{K}$ (m, n) and defined according to the probability distribution P, and the corresponding Q function. The AC encoding method also has access to $\mathcal{S}(m, n, \mathcal{K})$, which is the set of all sequences (over an alphabet $\mathcal{A}_m$ of size m) having length n, each of the sequences having a composition belonging to $\mathcal{K}$ (m, n).

The input to a given AC encoding operation is k information bits. The value of k may be determined so that k is the largest integer such that, for any target composition $\vec{k}_T \in$ (m, n), the following Equation (6) is true:

$$2^{-k} \geq \frac{P(\vec{k}_T)}{\mathcal{N}(\vec{k}_T)}. \tag{6}$$

A k-bit sequence $(u_1, u_2, \ldots, u_k)$ of information bits may be interpreted as the dyadic number $x \in [0, 1)$ with the binary expansion $0.\, u_1 u_2 \ldots u_k$. The dyadic number may be calculated using a function, such as:

$$x = \sum_{i=1}^{k} u_i 2^{-i}. \tag{7}$$

The dyadic number x is also available to the AC encoding method described herein.

The output of a given AC encoding operation is a length-n sequence of amplitude symbols. An AC encoding operation maps the sequence $(u_1, u_2, \ldots, u_k)$ to a length-n symbol sequence $s=(s_1, s_2, \ldots, s_n)$ in $\mathcal{S}(m, n, \mathcal{K})$. The choice of k guarantees that the mapping is injective.

The AC encoding method may be performed by a UE 115 or a BS 105 and, more specifically, by a wireless communication device, such as illustrated by FIG. 2 and implemented according to the examples of FIGS. 3-5. An AC encoding operation may include n iterations, each one of the iterations generating an amplitude symbol that is part of the output sequence $s=(s_1, s_2, \ldots, s_n)$. The AC encoding operation includes initialization, where t=0, $\vec{k}_t=\vec{0} \in \mathbb{R}^m$ and $x_t = x$.

The AC encoding operation iterates the following until (and including) t reaches n−1. A given iteration t computes $Q(\vec{k}_t+\vec{e}_i)$ for each possible $i \in \{1, 2, \ldots, m\}$ and computes $Q(\vec{k}_t)$, e.g., according to the recursion. Then, for each possible $i \in \{1, 2, \ldots, m\}$, the iteration t computes the ratio (transition probability):

$$p(\vec{k}_t \to \vec{k}_t + \vec{e}_i) \triangleq \frac{Q(\vec{k}_t + \vec{e}_i)}{Q(\vec{k}_t)}. \tag{8}$$

In other words, the transition probabilities are calculated using the Q function, and each transition probability corresponds to a respective prefix composition.

The iteration t then determines $j \equiv j_{t+1} \in \{1, 2, \ldots, m\}$ such that:

$$x_t \in \left[\sum_{i=1}^{j-1} p(\vec{k}_t \to \vec{k}_t + \vec{e}_i),\ \sum_{i=1}^{j} p(\vec{k}_t \to \vec{k}_t + \vec{e}_i)\right). \tag{9}$$

Then the iteration t outputs symbol $s_{t+1}$ by setting $s_{t+1}=a_j$. PGP

The iteration t updates the value of x by scaling $x_t$ to $x_{t+1}$ by computing:

$$x_{t+1} = \frac{x_t - \sum_{i=1}^{j-1} p(\vec{k}_t \to \vec{k}_t + \vec{e}_i)}{p(\vec{k}_t \to \vec{k}_t + \vec{e}_j)}. \tag{10}$$

The iteration t then updates the prefix composition by computing $\vec{k}_{t+1}=\vec{k}_t+\vec{e}_j$, and increases t by 1, and this completes iteration t. The encoding operation then moves to the next iteration (if iterations remain).

If the input x arbitrarily varies on [0, 1), e.g., when x is the realization of a uniform random variable on [0, 1), then the AC encoding method allows for sampling a sequence from $\mathcal{S}(m, n, \mathbb{R})$ with probability defined according to $\mathbb{P}_P$ over $\mathcal{S}(m, n, \mathcal{K})$. In other words, the probability that any sequence $s \in \mathcal{S}(m, n, \mathcal{K})$ is the output sequence of the AC encoding method is equal to:

$$\mathbb{P}_P(s) = \frac{P(\vec{k}(s))}{\mathcal{N}(\vec{k}(s))}. \tag{11}$$

This can be referred to as a distribution matching property.

The mapping from x to a symbol sequence is implicitly defined in the procedure of AC encoding and is determined by the ordering of the symbols in $\mathcal{A}_m$ (the ordering is used in the determination of $j_{t+1}$ steps). When x represents the dyadic number corresponding to a k-bit sequence $(u_1, u_2, \ldots, u_k)$ with a large k, e.g., $P(\vec{k}_T)/\mathcal{N}(\vec{k}_T)$ are small, then the corresponding x mimics the realization of a uniform random variable on [0, 1), and thus the distribution matching property is largely retained.

The following is an explanation of iterations in the AC encoding method, which may be performed by a UE 115 or a BS 105 and, more specifically, by a wireless communication device, such as illustrated by FIG. 2 and implemented according to the examples of FIGS. 3-5. In some examples, in a first iteration (e.g., t=0), the wireless communication device may access a first plurality of prefix compositions (e.g., $\vec{e}_1, \vec{e}_2, \ldots, \vec{e}_m$). Each prefix composition of the first plurality of prefix compositions corresponds to a respective symbol in the alphabet $\mathcal{A}_m$. The wireless communication device computes a first plurality of Q function values in accordance with Equation (2), wherein each Q function value of the first plurality of Q function values corresponds to a respective prefix composition of the first plurality of prefix compositions, and further wherein a first Q function value of the first plurality of Q function values corresponds to a first prefix composition. The first Q function value corresponds to a first weighted sum of a first plurality of multinomial coefficients, wherein each one of the first plurality of multinomial coefficients corresponds to a difference between a respective target composition and the first prefix composition.

The wireless communication device calculates a first plurality of transition probabilities in accordance with Equation (8). Each transition probability of the first plurality of transition probabilities corresponds to (and is proportional to) a respective Q function value of the first plurality of Q function values, and a first transition probability of the first plurality of transition probabilities corresponds to the first Q function value. In other words, the first transition probability corresponds to the first weighted sum of the first plurality of multinomial coefficients. The wireless communication device may partition a first interval into a first plurality of subintervals based at least in part on the first plurality of transition probabilities. Each subinterval of the first plurality of subintervals corresponds to a respective transition probability of the first plurality of transition probabilities, and the length of each subinterval of the first plurality of subintervals is proportional to a respective transition probability of the first plurality of transition probabilities.

The wireless communication device may further identify a first subinterval of the first plurality of subintervals using a first number (e.g., $x_0$). In other words, the wireless communication device identifies that the first number lies within the first subinterval, the first subinterval corresponding to the first transition probability of the first plurality of transition probabilities and the first transition probability of the first plurality of transition probabilities corresponding to the first prefix composition. The wireless communication device selects a first symbol $s_1$ to which the first prefix composition corresponds.

The wireless communication device may further apply a scaling operation to the first number $x_0$ according to Equation (10), thereby resulting in a second number $x_1$. Additionally, the wireless communication device may apply a scaling operation on the first subinterval, thereby generating a scaled first subinterval. Further iterations may be performed (if any remain).

The AC Encoding Method According to Interval Refinement

When x arbitrarily varies on [0, 1), e.g., when x is the realization of a uniform random variable on [0, 1), the AC encoding method can result in a partitioning of [0, 1) into subintervals of sizes having the form $\mathbb{P}_P(s)$. Each length-n symbol sequence $\mathcal{S}$(m, n, $\mathcal{K}$) corresponds to a distinct subinterval of size equal to $\mathbb{P}_P(s)$. Furthermore, the ordering of the subintervals corresponds to a lexicographical ordering of the symbol sequences that is further based on the ordering of the symbols in $A_m$.

Figure 6:
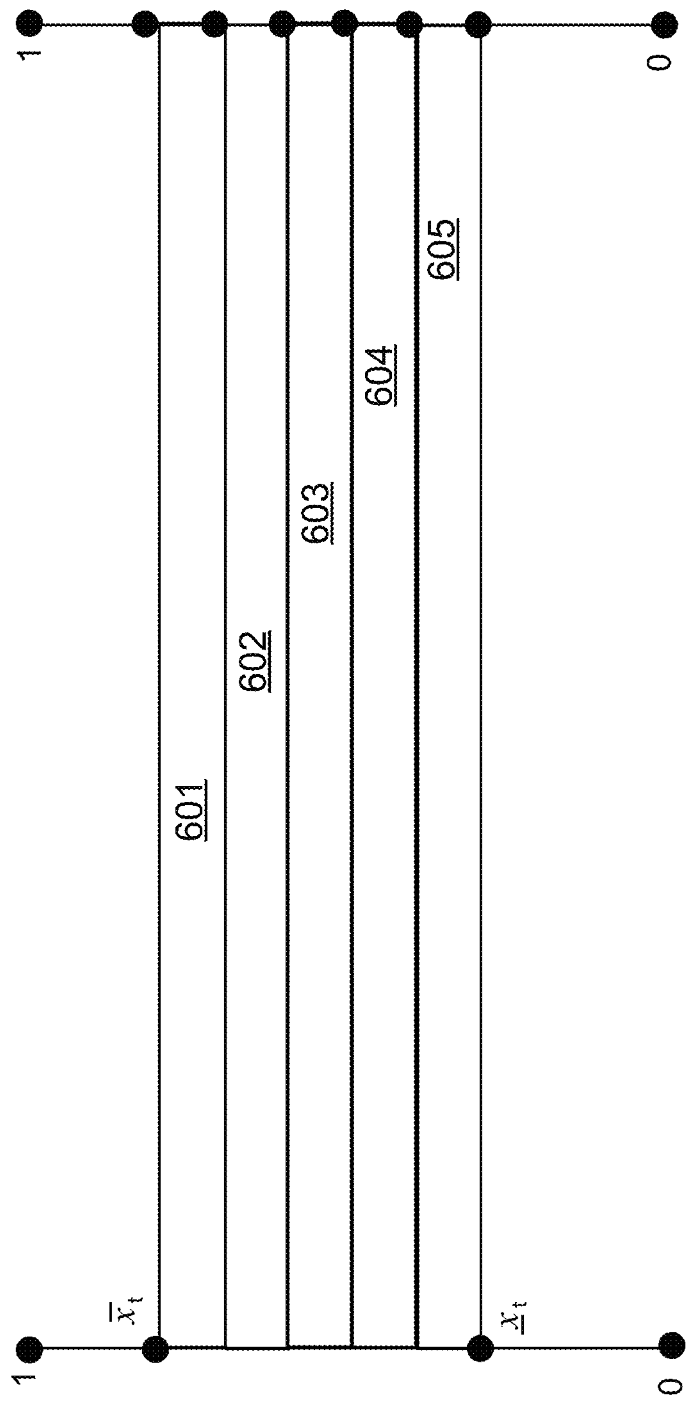
FIG. 6 is an illustration of an encoding operation, using interval refinement, according to one implementation.

FIG. 6 is an illustration of an AC encoding operation, using interval refinement, according to one implementation of the AC encoding method. The original interval includes the range [0, 1), which is refined over n iterations until $[\underline{x}_t, \overline{x}_t)$ defines a single subinterval that represents a binary expansion corresponding to the output sequence of amplitude symbols.

The unit interval $[0, 1)=[\underline{x}_0, \overline{x}_0)$ is successively refined to $[\underline{x}_n, \overline{x}_n)$, i.e.:

$$[\underline{x}_0, \overline{x}_0) \supseteq [\underline{x}_1, \overline{x}_1) \supseteq [\underline{x}_2, \overline{x}_2) \supseteq \ \ldots \ \supseteq [x_n, \overline{x}_n) \ni x. \tag{12}$$

For a general t ∈ {0, 1, . . . , n−1}, the interval refinement for a given iteration is given by:

$$\underline{x}_{t+1} = \underline{x}_t + (\overline{x}_t - \underline{x}_t) \sum_{i=1}^{j_{t+1}-1} p(\vec{k}_t \to \vec{k}_t + \vec{e}_i) \tag{13}$$

and $$\overline{x}_{t+1} = \underline{x}_t + (\overline{x}_t - \underline{x}_t) \sum_{i=1}^{j_{t+1}} p(\vec{k}_t \to \vec{k}_t + \vec{e}_i) \tag{14}$$

The refinement starts with t=0 (corresponding to the unit interval $[\underline{x}_0, \overline{x}_0)$) and increases by 1 per iteration. The interval $[\overline{x}_t, \overline{x}_t)$ corresponds to the symbols determined during the first t iterations, i.e., the prefix ($s_1$, $s_2$, . . . , $s_t$), and it satisfies the following equation:

$$\frac{\overline{x}_{t+1}\underline{x}_{t+1}}{\overline{x}_t\underline{x}_t} = p(\vec{k}_t \to \vec{k}_t + \vec{e}_{j_{t+1}}). \tag{15}$$

Equation (15) implies that the length of the interval $[\underline{x}_t, \overline{x}_t)$ is equal to:

$$\|[\underline{x}_t, \overline{x}_t)\| = Q(\vec{k}_t) = \sum_{\vec{k}_T \in \mathcal{K}} R(\vec{k}_T) \binom{n(\vec{k}_T - \vec{k}_t)}{\vec{k}_T - \vec{k}_t}. \tag{16}$$

In other words, a length of an interval is defined by the Q function. In this example, $R(\vec{k}_T)=P(\vec{k}_T)/\mathcal{N}(\vec{k}_T)$, and P is the probability distribution over $\mathcal{K}$ (m, n).

The final refined interval $[\underline{x}_n, \overline{x}_n)$ corresponds to the output symbol sequence s of the AC encoding operation and has length:

$$\|[\underline{x}_n, \overline{x}_n)\| = \prod_{t=0}^{n-1} p(\vec{k}_t \to \vec{k}_t + \vec{e}_{j_{t+1}}) = \frac{P(\vec{k}(s))}{\mathcal{N}(\vec{k}(s))}. \tag{17}$$

FIG. 6 illustrates an intermediate iteration in which one or more of the amplitude symbols have been determined, so a prefix exists, and the prefix narrows the unit interval down to remaining intervals 601-605. One of the intervals 601-605 will be a final refined interval, which corresponds to the output symbol sequence, and the final refined interval will be determined by one or more subsequent iterations. Of course, the number of remaining intervals 601-605 is simplified and for illustration only, and a number of iterations and intervals may be set for any particular application as appropriate.

In the example of FIG. 6, the input x arbitrarily varies on [0, 1), e.g., when x is the realization of a uniform random variable on [0, 1). As noted above, the input x may be a dyadic number that is based at least in part on the k input information bits.

For a general t∈{0, 1, . . . , n−1}, the interval $[\underline{x}_t, \overline{x}_t)$ corresponds to the prefix $$s_1^t = (s_1, s_2, \ldots, s_t).$$

Any length-n sequence having a composition in $\mathcal{K}$ (m, n) and having $$s_1^t$$

as the length-t prefix will have a final interval after n iterations. For these final intervals, the disjoint union is $[\underline{x}_t, \overline{x}_t)$.

For any composition $\vec{k}_T \in \mathcal{K}$ (m, n), the total number of sequences having composition $\vec{k}_T$ and having $$s_1^t$$

as the length-t prefix is given by the multinomial coefficient:

$$\mathcal{N}(\vec{k}_T - \vec{k}_t) = \binom{n(\vec{k}_T - \vec{k}_t)}{\vec{k}_T - \vec{k}_t}. \tag{18}$$

This is true whether looking at the encoding method as an interval refinement or as a graphical representation. Any sequence having composition $\vec{k}_T$ will receive a final interval with length equal to $P(\vec{k}_T)/\mathcal{N}(\vec{k}_T)=R(\vec{k}_T)$. Since final intervals are disjoint, summing over the target compositions give the length $[\underline{x}_t, \overline{x}_t)$, which is equal to $Q(\vec{k}_t)$.

The AC Encoding Method According to a Graphical Representation

Figure 7:
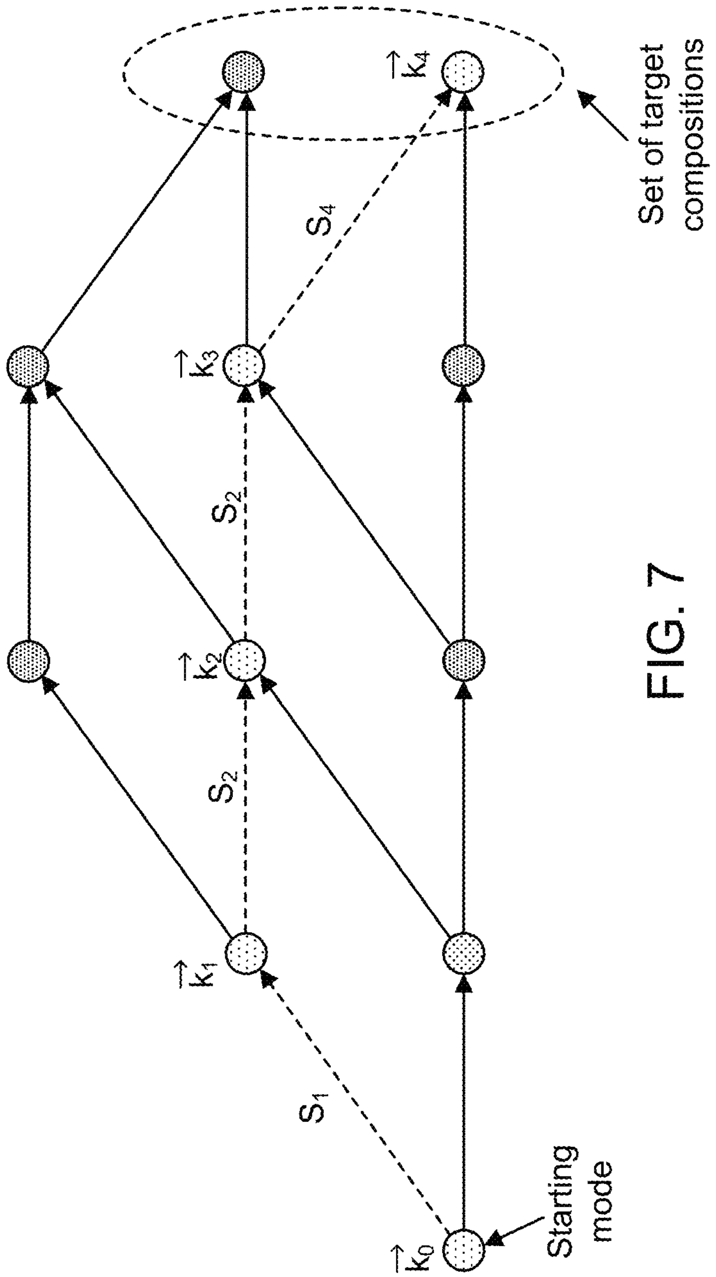
FIG. 7 illustrates an example of the AC encoding method, according to a graphical representation, according to one implementation.

FIG. 7 illustrates an example AC encoding operation of the AC encoding method, according to a graphical representation, for one implementation. Each of the nodes in the graph represents a prefix composition. The starting node (or root) corresponds to the prefix composition (0, 0), and the two nodes on the right-hand side of the graph illustrate the set of target compositions. A given AC encoding operation (a set of n iterations) traverses the graph from the starting node to one of the target compositions and, as a result, generates an output sequence of amplitude symbols $s=(s_1, s_2, \ldots, s_4)$.

The root is of depth 0 and corresponds to $\vec{0}\in\mathbb{R}^m$ representing the set of symbol sequences (over $\mathcal{A}_m$), each of which has composition belonging to $\mathcal{K}(m,n)$.

A given node of depth t≤n corresponds to (e.g., is labelled by) a composition $\vec{k}_t$ of length m and over {0, 1, . . . , t}. That is, $n(\vec{k}_t)=t$, and the sum of elements of $\vec{k}_t$ is t. The composition $\vec{k}_t$ represents the set of sequences $\mathcal{S}(m, n, \mathcal{K})$ such that the length-t prefix of each sequence has composition $$\vec{k}_t\colon \vec{k}(s_1^t) = \vec{k}_t.$$

A directed edge from a node of depth t to a node from depth t+1 is of the form $\vec{k}_t \to \vec{k}_t+\vec{e}_i$. In this example, $\vec{e}_i\in\mathbb{R}^m$ is the standard basis vector along coordinate i, and $\vec{k}_t+\vec{e}_i$ is a composition of length m and over {0, 1, . . . , t+1}. A directed edge corresponds to using symbol $a_i$ as the (possible) choice of $s_{t+1}$. A path from the root to a node of depth n gives rise a symbol sequence in $\mathcal{S}(m, n, \mathcal{K})$, and there are multiple different paths to traverse the graph from the root to either of the nodes on the right-hand side that represent the set of target compositions.

In the AC encoding method and for a given t∈{0, 1, . . . , n−1}, the determination of symbol $s_{t+1}$ corresponds to the transition from a (parent) node of depth t to a (child) node of depth t+1. Therefore, the rooted graph characterizes an AC encoding operation with each node of depth t representing a possible $\vec{k}_t$ in the operation after $$s_1^t$$

has been determined but before $s_{t+1}$ is determined.

Each ratio in the AC encoding operation can be viewed as a transition probability from node $\vec{k}_t$ to node $\vec{k}_t+\vec{e}_i$ for the standard basis vector $\vec{e}_i\in\mathbb{R}^m$.

A path from the root to a leaf node (i.e., an intermediate node) gives rise to the product of transition probabilities from the root to the left node as shown:

$$\prod_{t=0}^{n-1} p\left(\vec{k}_t \to \vec{k}_t + \vec{e}_{j_{t+1}}\right) = \prod_{t=0}^{n-1} \frac{Q\left(\vec{k}_t + \vec{e}_{j_{t+1}}\right)}{Q(\vec{k}_t)} = \frac{P\left(\vec{k}(s)\right)}{\mathcal{N}\left(\vec{k}(s)\right)}. \quad (19)$$

Each iteration in the AC encoding operation corresponds to a multiplicative factor in Equation (23). Once again, the transition probabilities are generated using the Q function.

FIGS. 8-11 illustrate a graphical representation of an example AC encoding method, according to one implementation. The implementation of FIGS. 8-11 is simplified for illustration, and it is understood that parameters, such as sequence length, alphabet size, number of target compositions, and the like may be set appropriately for a given communication application.

In the example of FIGS. 8-11, m=2, and the symbol alphabet $\mathcal{A}_2=\{1, 3\}$(i.e., $a_1=1$ and $a_2=3$). The symbol sequence length n=4. Further in this implementation there are two target compositions; the set $\mathcal{K}(2, 4)$ consists of N=2 target compositions of length 2 and over {0, 1, 2, 3, 4}, and the set $\mathcal{K}(2, 4)$ is specified as $\mathcal{K}(2, 4)=\{\vec{k}_{T_1}=(2, 2), \vec{k}_{T_2}=(3, 1)\}$.

The probability distribution P over $\mathcal{K}(2, 4)$ is denoted as $P(\vec{k}_{T_1})=p_1$ and $P(\vec{k}_{T_2})=p_2$.

Given a symbol sequence length of n=4, the finite number of output symbol sequences having composition $\vec{k}_{T_1}$ are (1, 1, 3, 3), (1, 3, 1, 3), (1, 3, 3, 1), (3, 1, 1, 3), (3, 1, 3, 1), (3, 3, 1, 1). Similarly, the output symbol sequences having composition $\vec{k}_{T_2}$ are (1, 1, 1, 3), (1, 1, 3, 1), (1, 3, 1, 1), (3, 1, 1, 1). As such, there are 6 symbol sequences having composition $\vec{k}_{T_1}$ and 4 symbol sequences having composition $\vec{k}_{T_2}$. The 10 total possible output symbol sequences are denoted by $\mathcal{S}(2, 4, \mathcal{K})$.

Given an input x as the realization of a uniform random variable on [0, 1), the AC encoding method allows for determining the probability distribution $\mathbb{P}_P$ over $\mathcal{S}$ such that for any s∈$\mathcal{S}(2, 4, \mathcal{K})$, and it holds that $\mathbb{P}_P(s)=P(\vec{k}(s))/\mathcal{N}(\vec{k}(s))$. In the example of FIGS. 8-11, the input x is a dyadic number that depends upon the k input information bits. For the illustrated example, the following is true for the probability distribution $\mathbb{P}_P$. For any sequence s∈$\mathcal{S}(2, 4, \mathcal{K})$, if the composition $\vec{k}(s)$ of the sequence s is equal to the target composition $\vec{k}_{T_1}$, then $$\mathbb{P}_P(s) = \frac{1}{6}p_1. \quad (20)$$

If the composition $\vec{k}(s)$ of the sequence s is equal to the target composition $\vec{k}_{T_2}$, then $$\mathbb{P}_P(s) = \frac{1}{4}p_2. \quad (21)$$

In other words, the output symbol sequence generated by the AC encoding method has composition $\vec{k}_{T_1}$ with probability $p_1/6$ and has composition $\vec{k}_{T_2}$ with probability $p_2/4$.

Before the first iteration, the AC encoding method initializes by, e.g., setting the parameter t to be equal to 0 and setting the parameter $\vec{k}_0$ to be equal to (0, 0).

Figure 8:
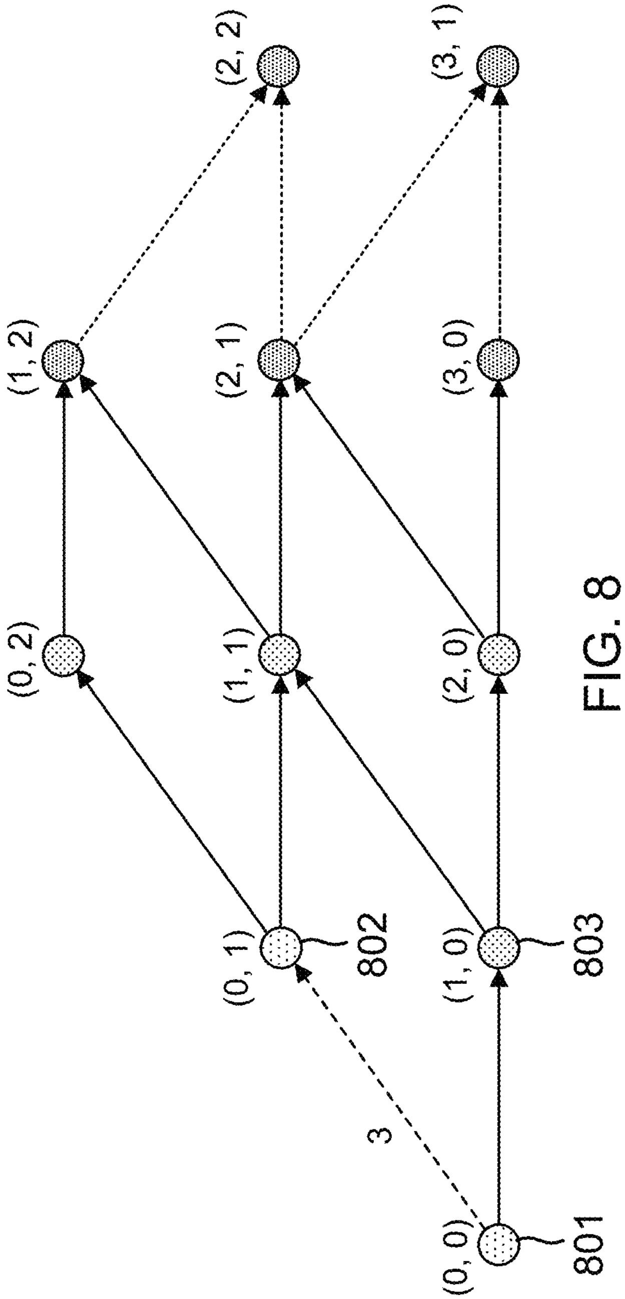
FIGS. 8-11 illustrate a graphical representation of the AC encoding method, according to one implementation.

FIG. 8 illustrates a first iteration. FIG. 8 starts with the starting node (or root node) 801, which corresponds to the prefix composition (0, 0). Each iteration moves by one node, and the two possible transitions in the first iteration include moving either to node 802 or node 803. Node 802 corresponds to a prefix composition (0, 1), whereas node 803 corresponds to a prefix composition (1, 0).

Each iteration first calculates the Q function for each of its possible transitions. The Q function is then used to calculate transition probabilities. Accordingly, the first iteration computes:

$$Q((1,0)) = \frac{1}{2}p_1 + \frac{3}{4}p_2, \tag{22}$$

$$Q((0,1)) = \frac{1}{2}p_1 + \frac{1}{4}p_2. \tag{23}$$

The first iteration then determines Q((0, 0))=Q((1, 0))+Q((0, 1)). The first iteration then forms the transition probabilities as follows:

$$p((0,0)\to(1,0)) = \frac{Q((1,0))}{Q((0,0))} = \frac{1}{2}p_1 + \frac{3}{4}p_2, \tag{24}$$

$$p((0,0)\to(0,1)) = \frac{Q((0,1))}{Q((0,0))} = \frac{1}{2}p_1 + \frac{1}{4}p_2. \tag{25}$$

The dyadic number has been calculated, and in this example, it has been calculated such that $x_0 \in [p((0,0)\to(0,1)), 1)$. Therefore, the first iteration outputs amplitude symbol 3 and updates $x_0$ to:

$$x_1 = \frac{x_0 - p((0,0)\to(1,0))}{p((0,0)\to(0,1))}. \tag{26}$$

The first iteration then updates:

$$\vec{k}_1 = (0,0) + \vec{e}_2 = (0,1). \tag{27}$$

and also increases t by 1.

Figure 9:
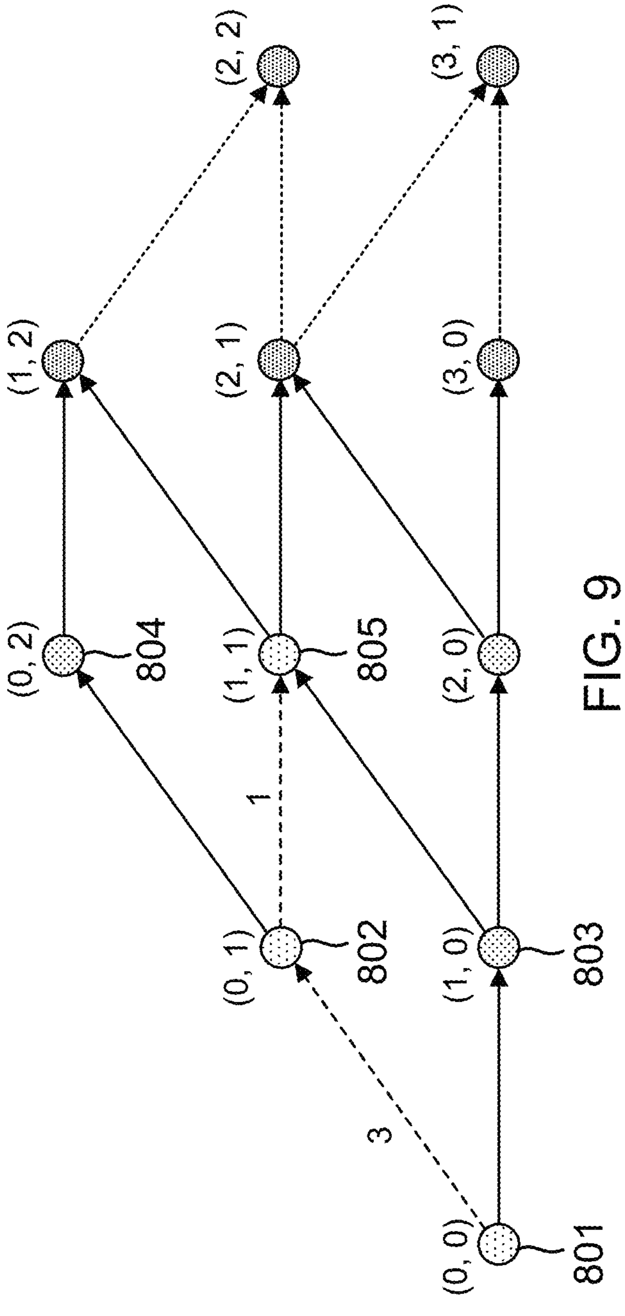

At the end of the first iteration, node 802 has been selected. FIG. 9 illustrates a second iteration. The possible transitions from node 802 include moving to node 804 or node 805. Once again, the second iteration calculates the Q function and then uses the results of the Q function to calculate the transition probability ratios. The second iteration first computes:

$$Q((0,2)) = \frac{1}{6}p_1, \tag{28}$$

$$Q((1,1)) = \frac{1}{3}p_1 + \frac{1}{4}p_2 \tag{29}$$

The second iteration then computes Q((0, 1))=Q((0, 2))+Q((1, 1)). The second iteration then forms the transition probabilities:

$$p((0,1)\to(0,2)) = \frac{Q((0,2))}{Q((0,1))} = \frac{p_1/6}{p_1/2 + p_2/4}, \tag{30}$$

-continued $$p((0,1)\to(1,1)) = \frac{Q((1,1))}{Q((0,1))} = \frac{p_1/3 + p_2/4}{p_1/2 + p_2/4}. \tag{31}$$

The number x has been calculated such that:

$$x_1 \in [0, p((0,1)\to(1,1))). \tag{32}$$

Therefore, the second iteration then outputs symbol 1 and updates $x_1$ to:

$$x_2 = \frac{x_1 - 0}{p((0,1)\to(1,1))}. \tag{33}$$

The second iteration then updates:

$$\vec{k}_2 = (0,1) + \vec{e}_1 = (1,1). \tag{34}$$

and also increases t by 1.

At the end of the second iteration, the node 805 has been selected, and it corresponds to the prefix composition (1, 1) because one 1 has been selected, and one 3 has been selected.

Figure 10:
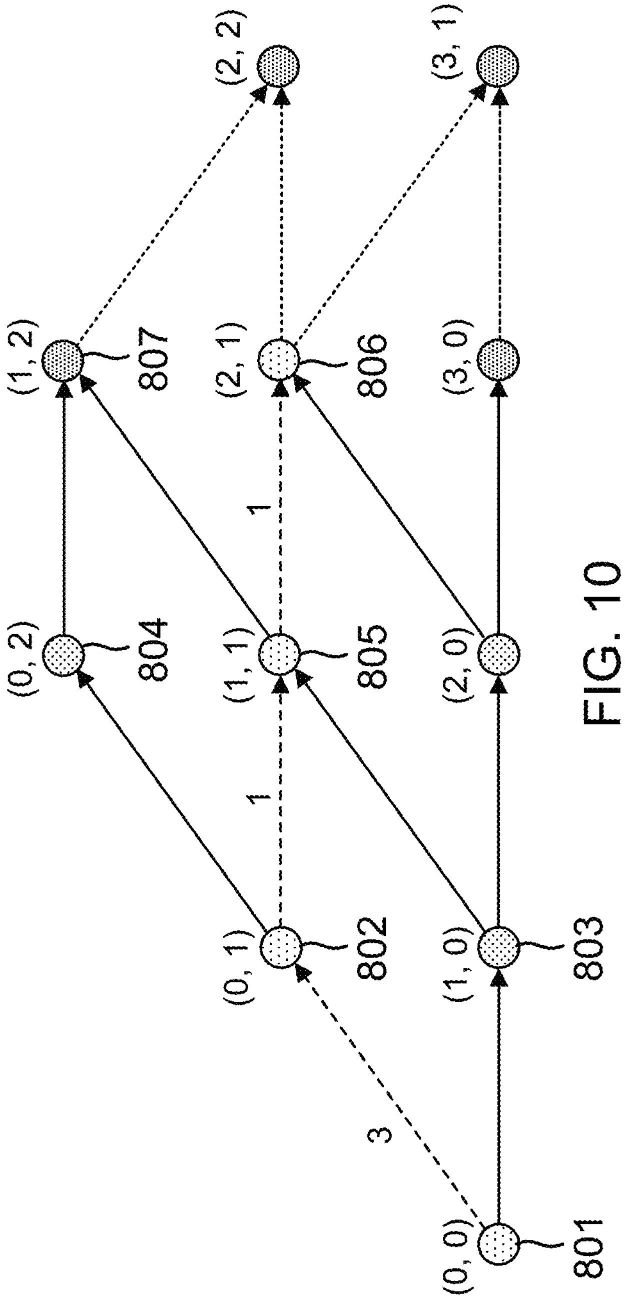

FIG. 10 illustrates the third iteration. The possible transitions for the third iteration include moving to either node 806 or node 807. The third iteration first computes:

$$Q((1,2)) = \frac{1}{6}p_1, \tag{35}$$

$$Q((2,1)) = \frac{1}{6}p_1 + \frac{1}{4}p_2. \tag{36}$$

The third iteration then computes Q((1, 1))=Q((1, 2))+Q((2, 1)). The third iteration uses the Q function to then form the transition probability ratios:

$$p((1,1)\to(1,2)) = \frac{Q((1,2))}{Q((1,1))} = \frac{p_1/6}{p_1/3 + p_2/4}, \tag{37}$$

$$p((1,1)\to(2,1)) = \frac{Q((2,1))}{Q((1,1))} = \frac{p_1/6 + p_2/4}{p_1/3 + p_2/4}. \tag{38}$$

The number x has been calculated such that:

$$x_2 \in [0, p((1,1)\to(2,1))). \tag{39}$$

The third iteration then outputs symbol 1 and updates $x_2$ to:

$$x_3 = \frac{x_2 - 0}{p((1,1)\to(2,1))}. \tag{40}$$

The third iteration ends by updating:

$$\vec{k}_3 = (1, 1) + \vec{e}_1 = (2, 1) \tag{41}$$

and also increasing t by 1.

At the end of the third iteration, node 806 has been selected. Node 806 corresponds to the prefix composition (2, 1) because two instances of 1 have been generated and one instance of 3 has been generated.

Figure 11:
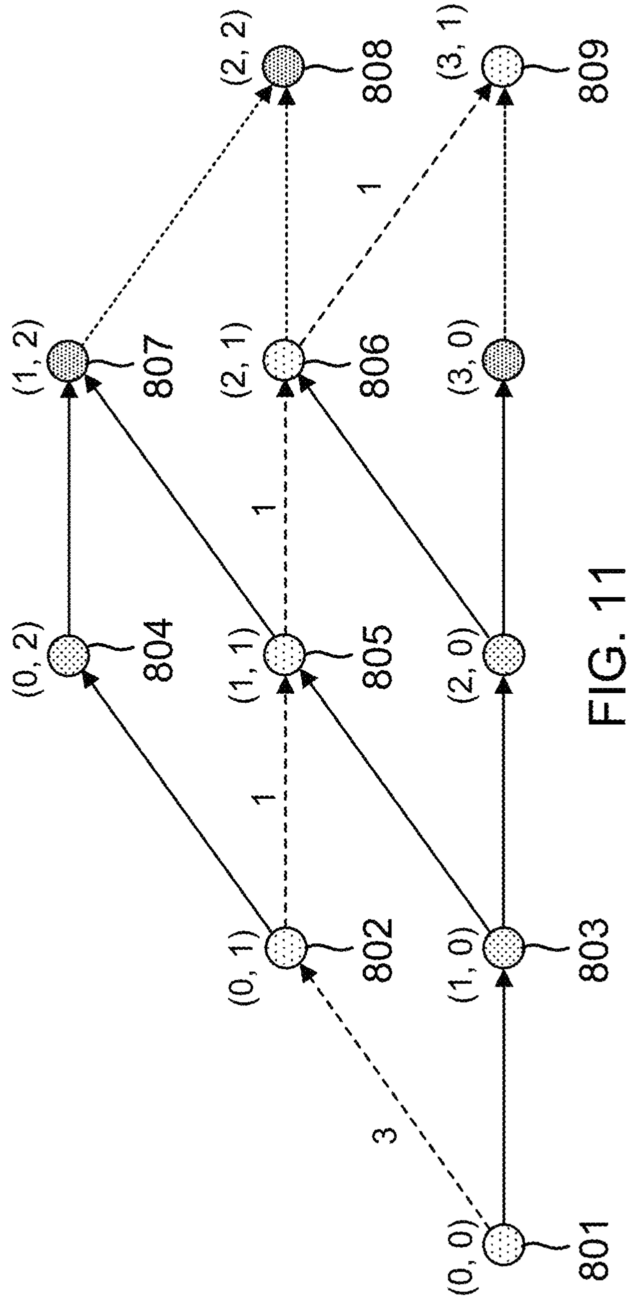

FIG. 11 illustrates the fourth and final iteration. The possibilities of transitioning from node 806 include moving to either node 808 or node 809. The nodes 808, 809 also correspond to the set of target compositions, which in this case is two target compositions—(2, 2) and (3, 1). The fourth iteration first computes:

$$Q((2, 2)) = \frac{1}{6}p_1, \tag{42}$$

$$Q((3, 1)) = \frac{1}{4}p_2. \tag{43}$$

The fourth iteration then computes Q((2, 1))=Q((2, 2))+Q((3, 1)). The fourth iteration then forms the ratios:

$$p((2, 1) \to (2, 2)) = \frac{Q((2, 2))}{Q((2,} = \frac{p_1/6}{p_1/6 + p_2/4}, \tag{44}$$

$$p((2, 1) \to (3, 1)) = \frac{Q((3, 1))}{Q((2, 1))} = \frac{p_2/4}{p_1/6 + p_2/4}. \tag{45}$$

The dyadic number has been calculated such that:

$$x_3 \in [0, p((2, 1) \to (3, 1))). \tag{46}$$

The fourth iteration then outputs symbol 1 and updates $x_3$ to:

$$x_4 = \frac{x_3 - 0}{p((2, 1) \to (3, 1))}. \tag{47}$$

The fourth iteration then updates:

$$\vec{k}_4 = (2, 1) + \vec{e}_1 = (3, 1). \tag{48}$$

and also increases t by 1. The output sequence of amplitude symbols is (3, 1, 1, 1). The process for the k information bits stops at this point, though subsequent sets of k information bits may be processed in further AC encoding operations as the application runs.

Single Composition Case for Encoding

Figure 12:
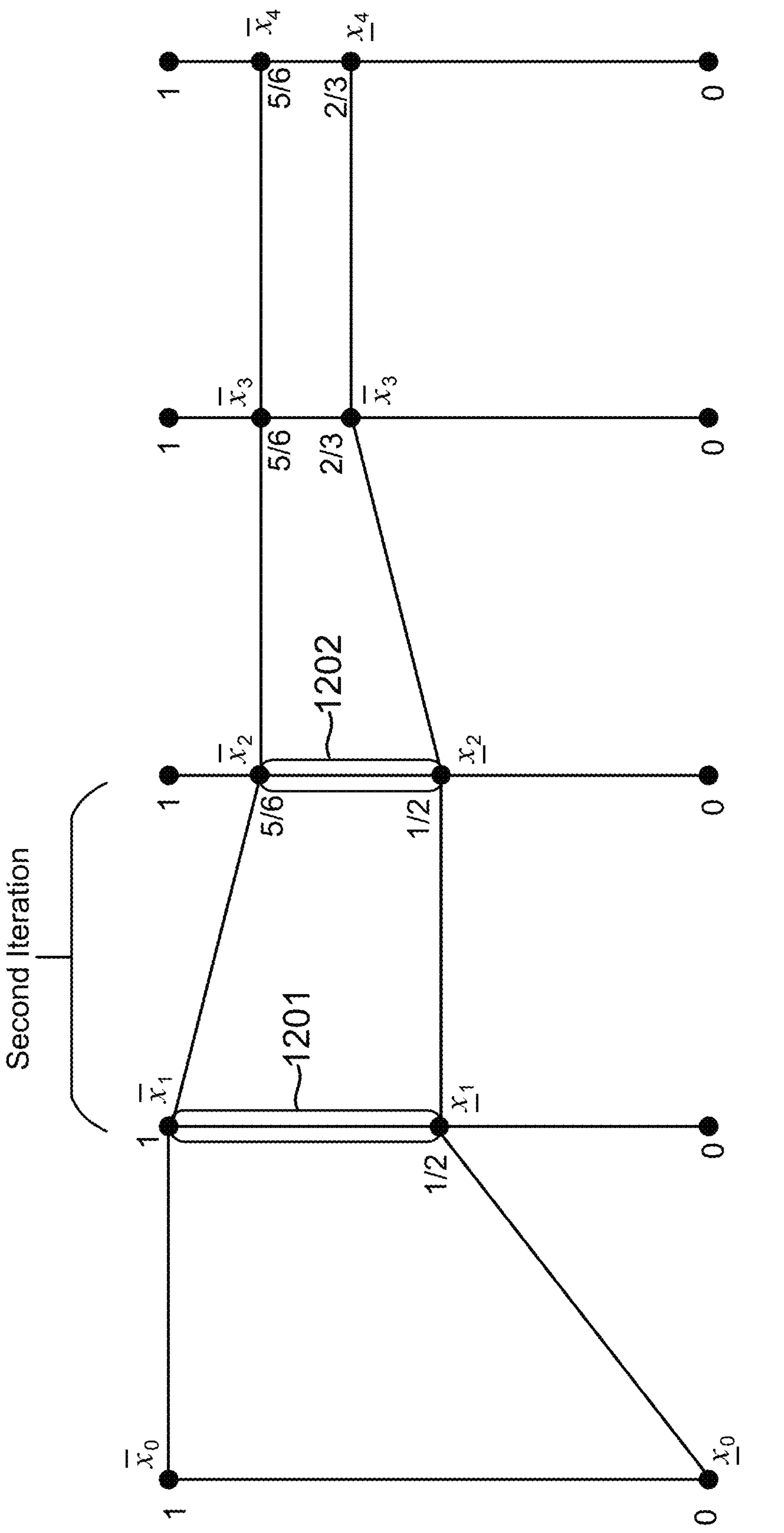
FIGS. 12-13 illustrates an interval-refinement representation and a graphical representation, respectively, of an AC encoding method in which there is only a single target composition.
Figure 13:
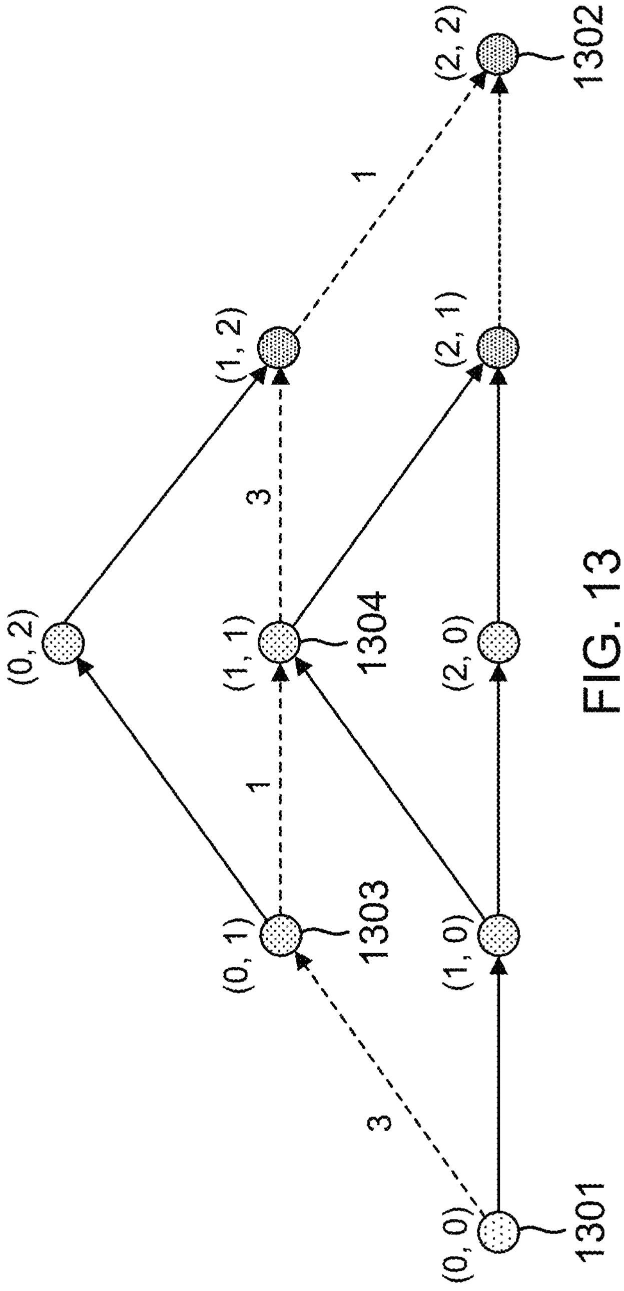

FIGS. 12-13 illustrates an interval-refinement representation and a graphical representation, respectively, of an AC encoding operation in which there is only a single target composition.

In this example, m=2 and the symbol alphabet $\mathcal{A}_2$={1, 3}. The symbol sequences are of length n=4, as in previous examples. In FIGS. 12-13, the AC encoding operation is applied to the single target composition (2, 2). Since there is a single target composition, $\mathcal{K}$ (2, 4)={(2, 2)}, R((2, 2))=1.

The dyadic number has been calculated such that the input x=¾∈[⅔, ⅚). In the interval refinement representation of FIG. 12, $[\underline{x}_0, \overline{x}_0)$=[0, 1) and the last refined intervals is $[\underline{x}_4, \overline{x}_4)$=[⅔, ⅚).

In the graphical representation of FIG. 13, the root node 1301 corresponds to (0, 0) and the leaf node 1302 corresponds to (2, 2). In other words, the AC encoding method traverses the graph from node 1301 to node 1302.

A review of the second iteration is illustrative. At the beginning of the second iteration, only $s_1$ has been determined, and the second iteration determines $s_2$. In other words, at the beginning of the second iteration, there are three unrevealed amplitude symbols.

The ratio of the refined interval lengths equals a transition probability. For instance, in this example, the refined interval 1201 has an interval length proportional to $\mathcal{N}$ ((1, 2))=3. The refined interval 1202 has an interval length proportional to $\mathcal{N}$ (1, 1))=2.

In the graphical representation, the transition probability from node 1303 (0, 1) to node 1304 (1, 1) is equal to $\mathcal{N}$ ((1, 1))/$\mathcal{N}$ ((2, 1)), i.e., $$\frac{\overline{x}_2 - \underline{x}_2}{\overline{x}_1 - \underline{x}_1} = p((0, 1) \to (1, 1)) = \frac{\mathcal{N}((1, 1))}{\mathcal{N}((2, 1))} = \frac{2}{3}. \tag{49}$$

In the example of FIGS. 12 and 13, the input x satisfies x∈[⅔, ⅚). The output symbol sequence generated by the AC encoding operation is (3, 1, 3, 1). The 4 ratios of consecutive refined interval lengths, over the four iterations, are ½, ⅔, ½, 1. These ratios of consecutive refined interval lengths are computed as follows:

$$\frac{\mathcal{N}((2, 2) - (0, 1))}{\mathcal{N}((2, 2) - (0, 0))} = \frac{\mathcal{N}((2, 1))}{\mathcal{N}((2, 2))} = \frac{1}{2}, \tag{50}$$

$$\frac{\mathcal{N}((2, 2) - (1, 1))}{\mathcal{N}((2, 2) - (0, 1))} = \frac{\mathcal{N}((1, 1))}{\mathcal{N}((2, 1))} = \frac{2}{3}, \tag{51}$$

$$\frac{\mathcal{N}((2, 2) - (1, 2))}{\mathcal{N}((2, 2) - (1, 1))} = \frac{\mathcal{N}((1, 0))}{\mathcal{N}((1, 1))} = \frac{1}{2}, \tag{52}$$

$$\frac{\mathcal{N}((2, 2) - (2, 2))}{\mathcal{N}((2, 2) - (1, 2))} = \frac{\mathcal{N}((0, 0))}{\mathcal{N}((1, 0))} = 1. \tag{53}$$

The AC Decoding Method

Various implementations include decoding actions associated with the AC encoding method. An AC decoding method may be performed by a UE 115 or a BS 105 and, more specifically, by a wireless communication device, such as illustrated by FIG. 2 and implemented according to the examples of FIGS. 3-5. For instance, the wireless communication device that transmits wireless packets with encoded information may also receive wireless packets with encoded information and perform decoding to retrieve information bits. Specifically, the wireless communication device may receive a packet that includes one or more length-n sequences of amplitude symbols and decode those one or more sequences to generate one or more sets of k information bits. As with encoding, the AC decoding method employs the Q function.

Under the same general setup as the AC encoding method, a length-n symbol sequence $s=(s_1, s_2, \ldots, s_n)$ encoded by the AC encoding method is available for the AC decoding method. The sequence s has length n and composition belonging to $\mathcal{K}$ (m, n), and each element of s is from the alphabet $\mathcal{A}_m$.

An AC decoding operation, according to the AC decoding method, maps the sequence s to a length-k bit sequence ($\widehat{u_1}$, $\widehat{u_2}$, . . . , $\widehat{u_k}$) as an estimate of the transmitted bit sequence ($u_1$, $u_2$, . . . , $u_k$), where k satisfies the same condition as encoding.

An AC decoding operation starts with initialization. The AC decoding operation initializes t=0, $\vec{k}_t=\vec{0}\in\mathbb{R}^m$ and $\underline{x}_0=0$, $\bar{x}_0=1$. Furthermore, the decoding operation is performed as a series of iterations, in this example, using n iterations for the received length-n sequence. The AC decoding operation iterates the following until (and including) t=n−1.

The iteration t computes $Q(\vec{k}_t+\vec{e}_i)$ for each possible $i\in\{1, 2, \ldots, m\}$ and compute $Q(\vec{k}_t)$, e.g., according to the recursion. For each possible $i\in\{1, 2, \ldots, m\}$, the iteration computes the ratio (transition probability):

$$p\left(\vec{k}_t \to \vec{k}_t + \vec{e}_i\right) \triangleq \frac{Q\left(\vec{k}_t + \vec{e}_i\right)}{Q(\vec{k}_t)}. \tag{54}$$

The iteration t then determines $j\equiv j_{t+1}\in\{1, 2, \ldots, m\}$ such that $a_j=s_{t+1}$.

The iteration t then computes:

$$\underline{x}_{t+1} = \underline{x}_t + \left(\bar{x}_t - \underline{x}_t\right)\sum_{i=1}^{j-1} p\left(\vec{k}_t \to \vec{k}_t + \vec{e}_i\right) \tag{55}$$

and $$\bar{x}_{t+1} = \underline{x}_t + \left(\bar{x}_t - \underline{x}_t\right)\sum_{i=1}^{j} p\left(\vec{k}_t \to \vec{k}_t + \vec{e}_i\right). \tag{56}$$

The iteration t then updates $\vec{k}_t$ by calculating $\vec{k}_{t+1}=\vec{k}_t+\vec{e}_j$. The iteration then increases t by 1, and this completes iteration t. Subsequent iterations (if any) are then performed.

The AC decoding operation then outputs ($\widehat{u_1}$, $\widehat{u_2}$, . . . , $\widehat{u_k}$) as follows. If $\bar{x}_n$ is not a dyadic number of the form $j2^{-k}$, the AC decoding operation takes the first k bits of the binary expansion of $\bar{x}_n$ as the decoded output. Otherwise, the AC decoding operation takes the first k bits of the binary expansion of $\underline{x}_n$ as the decoded output. The AC decoding method may include further AC decoding operations as more wireless packets are received.

A Further Encoding Example

Figure 14A:
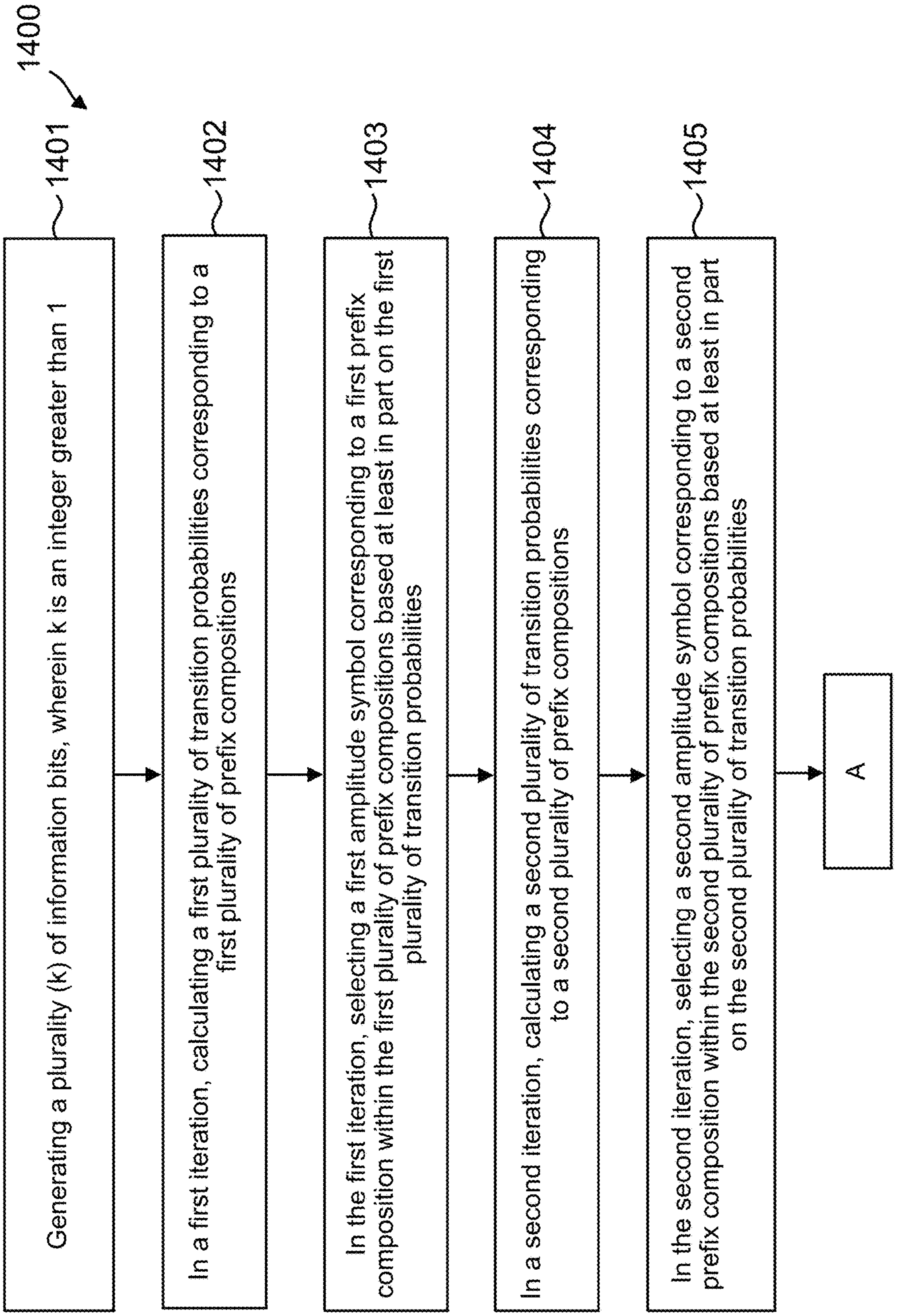
FIGS. 14A and 14B present an illustration of an example method for AC encoding, according to one implementation.
Figure 14B:
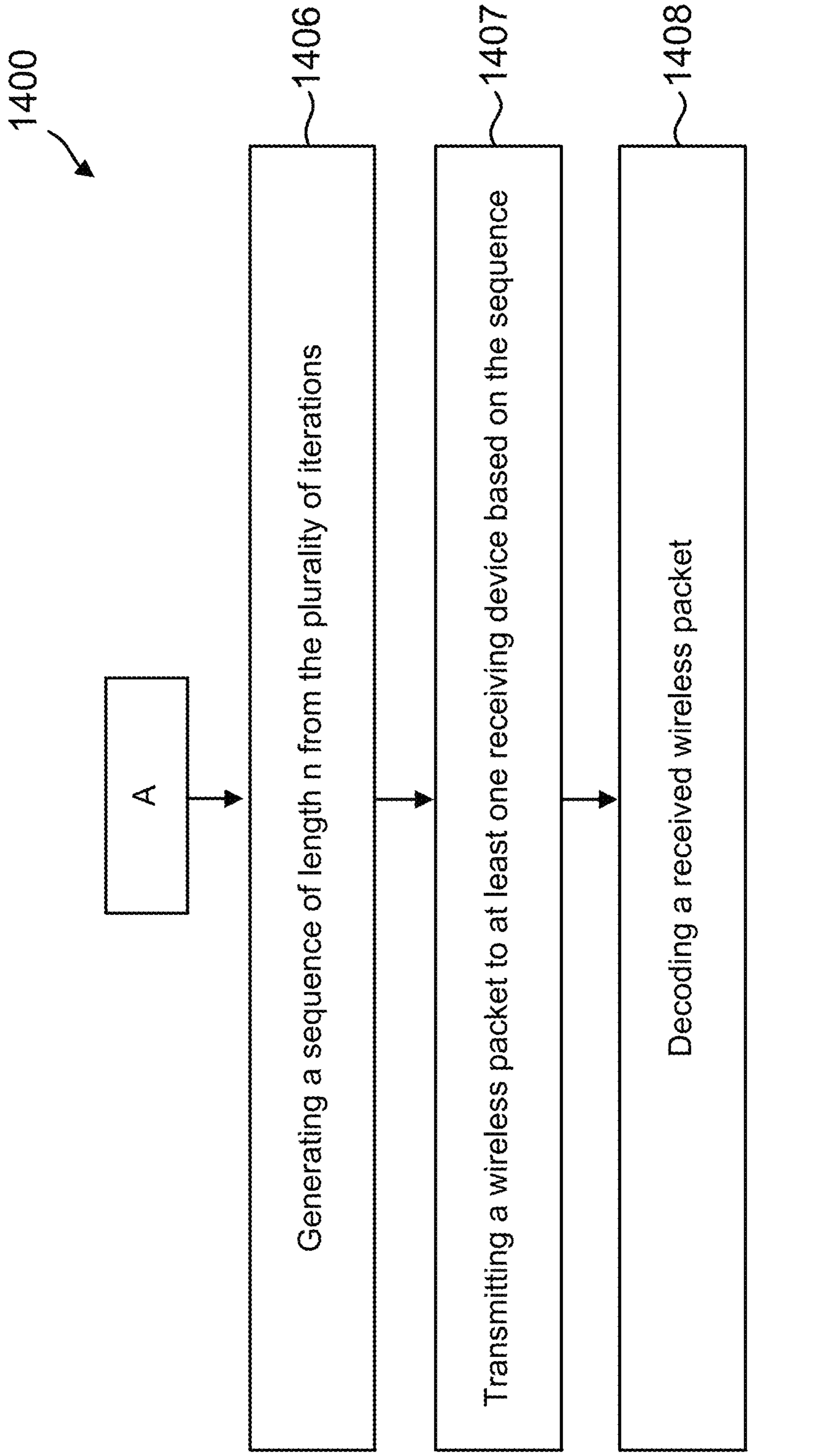

FIGS. 14A and 14B present an illustration of example method 1400 of AC encoding, according to one implementation. Specifically, method 1400 is an illustration of an AC encoding operation and an AC decoding operation, and it is understood that during use of a wireless communication device, encoding and decoding operations may be performed millions or billions of times as packets are transmitted and received. Method 1400 may be performed, e.g., by a wireless communication device such as those discussed above with respect to FIGS. 1-5.

At action 1401, the wireless communication device generates a plurality (k) of information bits. In this example, k is an integer greater than 1.

Actions 1402-1403 illustrate a first iteration of the encoding method. Specifically, at action 1402, the wireless communication device calculates a first plurality of transition probabilities corresponding to a first plurality of prefix compositions. For instance, the example of FIG. 8 shows a first iteration, and the transition probabilities are calculated for the transition from node 801 to node 802 and for the transition from node 801 to node 803. There is a correspondence between the first plurality of prefix compositions and the first plurality of transition probabilities; e.g., (1, 0) corresponds to p((0, 0)→(1, 0)). Of course, FIG. 8 is a simplified example, and it is understood that other implementations may use any appropriate number of transition probabilities.

Each of the transition probabilities is based at least in part on the Q function, as shown in Equation (8). The Q function is shown as Equation (2). A given transition probability of the first plurality of transition probabilities is proportional to a first weighted sum of a first plurality of multinomial coefficients, where each multinomial coefficient of the first plurality of multinomial coefficients corresponds to a difference between a first respective target composition of a set of one or more target compositions and a given prefix composition of the first plurality of prefix compositions. In the example of FIG. 8, these transition probabilities are shown as Q((1, 0))/Q((0, 0)) and Q((0,1))/Q((0, 0)), and other implementations may use any appropriate number of transition probabilities. Examples of given prefix compositions of the first plurality of prefix compositions include (1, 0) and (0, 1), and an example of a starting point prefix composition includes (0, 0).

At action 1403, the wireless communication device selects a first amplitude symbol corresponding to a first prefix composition within the first plurality of prefix compositions based at least in part on the first plurality of transition probabilities. The first amplitude symbol may be selected by determining that a first input number (such as x, which may be a dyadic number) corresponds to a particular one of the transition probability ratios, each one of the transition probabilities corresponding to one of the amplitude symbols and to one of the prefix compositions.

Action 1403 may also include a scaling operation for the first input number and updating the prefix composition, e.g., $\vec{k}_1=(0, 0)+\vec{e}_2$. The output of the first iteration is a first amplitude symbol $s_1$.

Actions 1404-1405 illustrate a second iteration. The second iteration takes into account the updated input number x as well as the updated prefix composition. For instance, the input number $x_0$ has been updated to $x_1$, and $\vec{k}_0$ has been updated to $\vec{k}_1$. The second iteration includes calculating a second plurality of transition probabilities, where those transition probabilities each correspond to a second plurality of prefix compositions. These prefix compositions include a set of prefix compositions that may be reached from the prefix composition $\vec{k}_1$ in a single iteration. The second iteration also includes selecting a second amplitude symbol corresponding to a second prefix composition based at least in part on a second set of transition probabilities. For each particular iteration, its set of transition probabilities may be calculated as shown in Equation (8). The second iteration may further include updating the input number x and the prefix composition to $\vec{k}_2$.

Although not specifically shown in FIG. 14, it is understood that the AC encoding method may include further iterations, so that a total quantity of iterations calculates the sequence of length-n $s=(s_1, s_2, \ldots, s_n)$ in $S(m, n, \mathcal{K})$. For instance, the AC encoding method may include n iterations to generate n amplitude symbols.

At action 1406, the wireless communication device transmits a wireless packet to at least one receiving device based on an output symbol sequence of length n. For instance, the output symbol sequence may be enhanced by forward error correction, converted into constellation points, and transmitted wirelessly to the receiving device.

The sequence of length n may be generated from the plurality of iterations. For instance, each iteration may generate one of the amplitude symbols, so that completion of the iterations results in the sequence of length n.

At action 1407, the wireless communication device may decode a subsequently received wireless data packet. An example of decoding is described above.

CLAUSES

Various implementations may be described by the following numbered clauses:

1. A method for wireless communication by a wireless communication device, the method comprising:

generating a plurality (k) of information bits, wherein k is an integer greater than 1;

performing an encoding operation on the plurality of information bits, the encoding operation having a plurality of iterations and is constrained by a length (n) and a set of one or more target compositions of a plurality of sequences, the encoding operation including:

in a first iteration, calculating a first plurality of transition probabilities corresponding to a first plurality of prefix compositions;

in the first iteration, selecting a first symbol corresponding to a first prefix composition within the first plurality of prefix compositions based at least in part on the first plurality of transition probabilities;

in a second iteration, calculating a second plurality of transition probabilities corresponding to a second plurality of prefix compositions, wherein the second plurality of prefix compositions represents a remaining subset of the plurality of sequences associated with the first prefix composition; and in the second iteration, selecting a second symbol corresponding to a second prefix composition within the second plurality of prefix compositions based at least in part on the second plurality of transition probabilities; and transmitting a wireless packet to at least one receiving device based on a sequence of length n, which is generated from the plurality of iterations, wherein n is equal to a total quantity of the plurality of iterations, further wherein the sequence comprises the first symbol and the second symbol.

2. The method of clause 1, wherein the set of one or more target compositions excludes at least one composition having one or more sequences of length (n).

3. The method of any of clauses 1-2, further comprising:

performing n−2 further iterations subsequent to the second iteration, each of the n−2 further iterations generating one of the n symbols.

4. The method of any of clauses 1-3, wherein a given target composition of the set of one or more target compositions includes m entries, wherein m is an integer greater than 1, wherein each one of the entries represents a quantity of occurrences of a respective symbol within a possible sequence within the plurality of sequences.

5. The method of clause 4, wherein a sum of the m entries is equal to n.

6. The method of any of clauses 1-5, further comprising:

calculating a dyadic number based upon the plurality of information bits, and wherein selecting the first symbol includes determining that the dyadic number corresponds to a first transition probability of the first plurality of transition probabilities, the first transition probability corresponding to the first prefix composition.

7. The method of clause 6, further comprising:

calculating an updated input number from the dyadic number; and wherein selecting the second symbol includes determining that the updated input number corresponds to a second transition probability of the second plurality of transition probabilities, the second transition probability corresponding to the second prefix composition.

8. The method of any of clauses 1-7, wherein a cardinality of the first plurality of prefix compositions is m, wherein m is an integer greater than 1 and represents a quantity of symbols within an alphabet of symbols.

9. The method of any of clauses 1-8, wherein a given transition probability of the first plurality of transition probabilities is proportional to a first weighted sum of a first plurality of multinomial coefficients, wherein each multinomial coefficient of the first plurality of multinomial coefficients corresponds to a difference between a first respective target composition of the set of one or more target compositions and a given prefix composition of the first plurality of prefix compositions.

10. The method of clause 9, wherein a given transition probability of the second plurality of transition probabilities is proportional to a second weighted sum of a second plurality of multinomial coefficients, wherein each multinomial coefficient of the second plurality of multinomial coefficients corresponds to a difference between a second respective target composition of the set of one or more target compositions and a given prefix composition of the second plurality of prefix compositions.

11. The method of any of clauses 1-10, further comprising:

receiving a subsequent wireless packet from a transmitting wireless communication device, the subsequent wireless packet including information having a received symbol sequence of n symbols and defined by an alphabet of symbols; and decoding the subsequent wireless packet, wherein decoding comprises: performing a plurality (n) of decoding iterations, each decoding iteration including computing a plurality of transition probabilities in a decoding interval for a plurality of prefix compositions, and after n of the decoding iterations generating a binary expansion corresponding to a final decoding interval.

12. The method of any of clauses 1-11, wherein the first iteration comprises:

partitioning a first interval into a first plurality of subintervals based at least in part on the first plurality of transition probabilities, wherein each subinterval of the first plurality of subintervals corresponds to a respective transition probability of the first plurality of transition probabilities, and a length of each subinterval of the first plurality of subintervals is proportional to a respective transition probability of the first plurality of transition probabilities; and identifying a first subinterval of the first plurality of subintervals using a first number that is generated from the plurality of information bits, wherein the first subinterval corresponds to the first symbol.

13. The method of any of clauses 1-11, wherein the encoding operation and the transmitting is performed by a wireless base station (BS) or a user equipment (UE).

14. A wireless communication device comprising:

at least one modem;

at least one processor coupled with the at least one modem; and at least one memory coupled with the at least one processor and storing processor-readable code that, when executed by the at least one processor in conjunction with the at least one modem, is configured to:

perform an encoding operation on a plurality of information bits, the encoding operation having a plurality of iterations and is constrained by a length (n) and a set of one or more target compositions of a plurality of sequences, the encoding operation including:

in a first iteration, calculate a first plurality of transition probabilities corresponding to a first plurality of prefix compositions, wherein a given transition probability of the first plurality of transition probabilities is proportional to a first weighted sum of a first plurality of multinomial coefficients, wherein each multinomial coefficient of the first plurality of multinomial coefficients corresponds to a difference between a first respective target composition of the set of one or more target compositions and a given prefix composition of the first plurality of prefix compositions;

in the first iteration, select a first symbol corresponding to a first prefix composition within the first plurality of prefix compositions based at least in part on the first plurality of transition probabilities; and perform further iterations of the plurality of iterations; and transmit a wireless packet to at least one receiving device based on a sequence of length n, which is generated from the plurality of iterations, wherein n is equal to a total quantity of the plurality of iterations, further wherein the sequence comprises the first symbol.

15. The wireless communication device of clause 14, wherein a given target composition of the set of one or more target compositions includes m entries, wherein m is an integer greater than 1, wherein each one of the entries represents a quantity of occurrences of a respective symbol within a possible sequence within the plurality of sequences.

16. The wireless communication device of clause 15, wherein a sum of the m entries is equal to n.

17. The wireless communication device of any of clauses 14-16, wherein the at least one processor in conjunction with the at least one modem is further configured to:

calculate a dyadic number based upon the plurality of information bits, and wherein selecting the first symbol includes determining that the dyadic number corresponds to a first transition probability of the first plurality of transition probabilities, the first transition probability corresponding to the first prefix composition.

18. The wireless communication device of clause 17, wherein the at least one processor in conjunction with the at least one modem, is further configured to:

calculate an updated input number from the dyadic number; and in a second iteration, determine that the updated input number corresponds to a second transition probability that corresponds to a second prefix composition.

19. The wireless communication device of any of clauses 14-18, wherein a cardinality of the first plurality of prefix compositions is m, wherein m is an integer greater than 1 and represents a quantity of symbols within an alphabet of symbols.

20. The wireless communication device of any of clauses 14-19, wherein the at least one processor in conjunction with the at least one modem is further configured to:

receive a subsequent wireless packet from a transmitting wireless communication device, the subsequent wireless packet including information having a received symbol sequence of n symbols and defined by an alphabet of symbols; and decode the subsequent wireless packet, including: performing a plurality (n) of decoding iterations, each decoding iteration including computing a plurality of transition probabilities in a decoding interval for a plurality of prefix compositions, and after n of the decoding iterations generating a binary expansion corresponding to a final decoding interval.

21. A non-transitory computer-readable medium having program code recorded thereon for wireless communication by a wireless communication device, the program code comprising:

code for performing an encoding operation on a plurality of information bits, the encoding operation having a plurality of iterations and is constrained by a sequence length and a set of one or more target compositions of a plurality of sequences, the encoding operation including:

in a first iteration, calculating a first plurality of transition probabilities corresponding to a first plurality of prefix compositions;

in the first iteration, selecting a first symbol corresponding to a first prefix composition within the first plurality of prefix compositions based at least in part on the first plurality of transition probabilities;

in a second iteration, calculating a second plurality of transition probabilities corresponding to a second plurality of prefix compositions, wherein the second plurality of prefix compositions represents a remaining subset of the plurality of sequences associated with the first prefix composition; and in the second iteration, selecting a second symbol corresponding to a second prefix composition within the second plurality of prefix compositions based at least in part on the second plurality of transition probabilities; and code for transmitting a wireless packet to at least one receiving device based on an output sequence conforming to the sequence length, wherein the output sequence is generated from the plurality of iterations, and wherein the output sequence comprises the first symbol and the second symbol within a plurality of symbols.

22. The non-transitory computer-readable medium of clause 21, wherein the sequence length is n and is equal to a total quantity of the plurality of iterations.

23. The non-transitory computer-readable medium of any of clauses 21-22, wherein a given transition probability of the first plurality of transition probabilities is proportional to a first weighted sum of a first plurality of multinomial coefficients, wherein each multinomial coefficient of the first plurality of multinomial coefficients corresponds to a difference between a first respective target composition of the set of one or more target compositions and a given prefix composition of the first plurality of prefix compositions.

24. The non-transitory computer-readable medium of clause 23, wherein a given transition probability of the second plurality of transition probabilities is proportional to a second weighted sum of a second plurality of multinomial coefficients, wherein each multinomial coefficient of the second plurality of multinomial coefficients corresponds to a difference between a second respective target composition of the set of one or more target compositions and a given prefix composition of the second plurality of prefix compositions.

25. The non-transitory computer-readable medium of any of clauses 21-23, further comprising:

code for receiving a subsequent wireless packet from a transmitting wireless communication device, the subsequent wireless packet including information having a received symbol sequence of n symbols and defined by an alphabet of symbols; and code for decoding the subsequent wireless packet, wherein decoding comprises performing a plurality (n) of decoding iterations, each decoding iteration including computing a plurality of transition probabilities in a decoding interval for a plurality of prefix compositions, and after n of the decoding iterations generating a binary expansion corresponding to a final decoding interval.

26. A wireless communication device configured to encode a plurality of information bits, the wireless communication device comprising:

means for, in a first iteration, calculating a first plurality of transition probabilities corresponding to a first plurality of prefix compositions, wherein a given transition probability of the first plurality of transition probabilities is proportional to a first weighted sum of a first plurality of multinomial coefficients, wherein each multinomial coefficient of the first plurality of multinomial coefficients corresponds to a difference between a first respective target composition of a set of one or more target compositions and a given prefix composition of the first plurality of prefix compositions;

means for, in the first iteration, selecting a first symbol corresponding to a first prefix composition within the first plurality of prefix compositions based at least in part on the first plurality of transition probabilities;

means for performing further iterations of a plurality of iterations; and means for transmitting a wireless packet to at least one receiving device based on an output sequence of length n, which is generated from the plurality of iterations, wherein n is equal to a total quantity of the plurality of iterations, further wherein the output sequence comprises the first symbol.

27. The wireless communication device of clause 26, further comprising:

means for calculating a dyadic number based upon the plurality of information bits, and wherein selecting the first symbol includes determining that the dyadic number corresponds to a first transition probability of the first plurality of transition probabilities, the first transition probability corresponding to the first prefix composition.

28. The wireless communication device of clause 27, further comprising:

means for calculating an updated input number from the dyadic number; and means for determining, in a second iteration, that the updated input number corresponds to a second transition probability that corresponds to a second prefix composition.

29. The wireless communication device of any of clauses 26-28, wherein a cardinality of the first plurality of prefix compositions is m, wherein m is an integer greater than 1 and represents a quantity of symbols within an alphabet of symbols.

30. The wireless communication device of any of clauses 26-29, further comprising:

means for receiving a subsequent wireless packet from a transmitting wireless communication device, the subsequent wireless packet including information having a received symbol sequence of n symbols and defined by an alphabet of symbols; and means for decoding the subsequent wireless packet, including means for performing a plurality (n) of decoding iterations, each decoding iteration including computing a plurality of transition probabilities in a decoding interval for a plurality of prefix compositions, and after n of the decoding iterations generating a binary expansion corresponding to a final decoding interval.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device, the method comprising:
- generating a plurality (k) of information bits, wherein k is an integer greater than 1;
- performing an encoding operation on the plurality of information bits, the encoding operation having a plurality of iterations and is constrained by a length (n) and a set of one or more target compositions of a plurality of sequences, the encoding operation including:
  - in a first iteration, calculating a first plurality of transition probabilities corresponding to a first plurality of prefix compositions;
  - in the first iteration, selecting a first symbol corresponding to a first prefix composition within the first plurality of prefix compositions based at least in part on the first plurality of transition probabilities;
  - in a second iteration, calculating a second plurality of transition probabilities corresponding to a second plurality of prefix compositions, wherein the second plurality of prefix compositions represents a remaining subset of the plurality of sequences associated with the first prefix composition; and
  - in the second iteration, selecting a second symbol corresponding to a second prefix composition within the second plurality of prefix compositions based at least in part on the second plurality of transition probabilities;
- transmitting a wireless packet to at least one receiving device based on a sequence of length n, which is generated from the plurality of iterations, wherein n is equal to a total quantity of the plurality of iterations, further wherein the sequence comprises the first symbol and the second symbol.

2. The method of claim 1, wherein the set of one or more target compositions excludes at least one composition having one or more sequences of length (n).

3. The method of claim 1, further comprising:
- performing n−2 further iterations subsequent to the second iteration, each of the n−2 further iterations generating one of the n symbols.

4. The method of claim 1, wherein a given target composition of the set of one or more target compositions includes m entries, wherein m is an integer greater than 1, wherein each one of the entries represents a quantity of occurrences of a respective symbol within a possible sequence within the plurality of sequences.

5. The method of claim 4, wherein a sum of the m entries is equal to n.

6. The method of claim 1, further comprising:
- calculating a dyadic number based upon the plurality of information bits, and wherein selecting the first symbol includes determining that the dyadic number corresponds to a first transition probability of the first plurality of transition probabilities, the first transition probability corresponding to the first prefix composition.

7. The method of claim 6, further comprising:
- calculating an updated input number from the dyadic number; and wherein selecting the second symbol includes determining that the updated input number corresponds to a second transition probability of the second plurality of transition probabilities, the second transition probability corresponding to the second prefix composition.

8. The method of claim 1, wherein a cardinality of the first plurality of prefix compositions is m, wherein m is an integer greater than 1 and represents a quantity of symbols within an alphabet of symbols.

9. The method of claim 1, wherein a given transition probability of the first plurality of transition probabilities is proportional to a first weighted sum of a first plurality of multinomial coefficients, wherein each multinomial coefficient of the first plurality of multinomial coefficients corresponds to a difference between a first respective target composition of the set of one or more target compositions and a given prefix composition of the first plurality of prefix compositions.

10. The method of claim 9, wherein a given transition probability of the second plurality of transition probabilities is proportional to a second weighted sum of a second plurality of multinomial coefficients, wherein each multinomial coefficient of the second plurality of multinomial coefficients corresponds to a difference between a second respective target composition of the set of one or more target compositions and a given prefix composition of the second plurality of prefix compositions.

11. The method of claim 1, further comprising:
- receiving a subsequent wireless packet from a transmitting wireless communication device, the subsequent wireless packet including information having a received symbol sequence of n symbols and defined by an alphabet of symbols; and
- decoding the subsequent wireless packet, wherein decoding comprises:

performing a plurality (n) of decoding iterations, each decoding iteration including computing a plurality of transition probabilities in a decoding interval for a plurality of prefix compositions, and after n of the decoding iterations generating a binary expansion corresponding to a final decoding interval.

12. The method of claim 1, wherein the first iteration comprises:

partitioning a first interval into a first plurality of subintervals based at least in part on the first plurality of transition probabilities, wherein each subinterval of the first plurality of subintervals corresponds to a respective transition probability of the first plurality of transition probabilities, and a length of each subinterval of the first plurality of subintervals is proportional to a respective transition probability of the first plurality of transition probabilities; and identifying a first subinterval of the first plurality of subintervals using a first number that is generated from the plurality of information bits, wherein the first subinterval corresponds to the first symbol.

13. The method of claim 1, wherein the encoding operation and the transmitting is performed by a wireless base station (BS) or a user equipment (UE).

14. A wireless communication device comprising:

at least one modem;

at least one processor coupled with the at least one modem; and at least one memory coupled with the at least one processor and storing processor- readable code that, when executed by the at least one processor in conjunction with the at least one modem, is configured to:

perform an encoding operation on a plurality of information bits, the encoding operation having a plurality of iterations and is constrained by a length (n) and a set of one or more target compositions of a plurality of sequences, the encoding operation including:

in a first iteration, calculate a first plurality of transition probabilities corresponding to a first plurality of prefix compositions, wherein a given transition probability of the first plurality of transition probabilities is proportional to a first weighted sum of a first plurality of multinomial coefficients, wherein each multinomial coefficient of the first plurality of multinomial coefficients corresponds to a difference between a first respective target composition of the set of one or more target compositions and a given prefix composition of the first plurality of prefix compositions;

in the first iteration, select a first symbol corresponding to a first prefix composition within the first plurality of prefix compositions based at least in part on the first plurality of transition probabilities; and perform further iterations of the plurality of iterations; and transmit a wireless packet to at least one receiving device based on a sequence of length n, which is generated from the plurality of iterations, wherein n is equal to a total quantity of the plurality of iterations, further wherein the sequence comprises the first symbol.

15. The wireless communication device of claim 14, wherein a given target composition of the set of one or more target compositions includes m entries, wherein m is an integer greater than 1, wherein each one of the entries represents a quantity of occurrences of a respective symbol within a possible sequence within the plurality of sequences.

16. The wireless communication device of claim 14, wherein the at least one processor in conjunction with the at least one modem is further configured to:

calculate a dyadic number based upon the plurality of information bits, and wherein selecting the first symbol includes determining that the dyadic number corresponds to a first transition probability of the first plurality of transition probabilities, the first transition probability corresponding to the first prefix composition.

17. The wireless communication device of claim 16, wherein the at least one processor in conjunction with the at least one modem, is further configured to:

calculate an updated input number from the dyadic number; and in a second iteration, determine that the updated input number corresponds to a second transition probability that corresponds to a second prefix composition.

18. The wireless communication device of claim 14, wherein a cardinality of the first plurality of prefix compositions is m, wherein m is an integer greater than 1 and represents a quantity of symbols within an alphabet of symbols.

19. The wireless communication device of claim 14, wherein the at least one processor in conjunction with the at least one modem is further configured to:

receive a subsequent wireless packet from a transmitting wireless communication device, the subsequent wireless packet including information having a received symbol sequence of n symbols and defined by an alphabet of symbols; and decode the subsequent wireless packet, including: performing a plurality (n) of decoding iterations, each decoding iteration including computing a plurality of transition probabilities in a decoding interval for a plurality of prefix compositions, and after n of the decoding iterations generating a binary expansion corresponding to a final decoding interval.

20. A wireless communication device configured to encode a plurality of information bits, the wireless communication device comprising:

means for, in a first iteration, calculating a first plurality of transition probabilities corresponding to a first plurality of prefix compositions, wherein a given transition probability of the first plurality of transition probabilities is proportional to a first weighted sum of a first plurality of multinomial coefficients, wherein each multinomial coefficient of the first plurality of multinomial coefficients corresponds to a difference between a first respective target composition of a set of one or more target compositions and a given prefix composition of the first plurality of prefix compositions;

means for, in the first iteration, selecting a first symbol corresponding to a first prefix composition within the first plurality of prefix compositions based at least in part on the first plurality of transition probabilities;

means for performing further iterations of a plurality of iterations; and means for transmitting a wireless packet to at least one receiving device based on an output sequence of length n, which is generated from the plurality of iterations, wherein n is equal to a total quantity of the plurality of iterations, further wherein the output sequence comprises the first symbol.

* * * * *